(12) United States Patent
Kayara

(10) Patent No.: US 11,078,840 B2
(45) Date of Patent: *Aug. 3, 2021

(54) WIND FUNNEL AND GAS COMBUSTION TURBINE SYSTEMS INCLUDING COMPRESSION SECTIONS

(71) Applicant: Sammy Kayara, Naples, FL (US)

(72) Inventor: Sammy Kayara, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,003

(22) Filed: Apr. 28, 2020

(65) Prior Publication Data

US 2020/0256248 A1     Aug. 13, 2020

Related U.S. Application Data

(63) Continuation of application No. 16/386,451, filed on Apr. 17, 2019, now Pat. No. 10,669,935.

(Continued)

(51) Int. Cl.
*F02C 7/00* (2006.01)
*F02C 7/04* (2006.01)
(Continued)

(52) U.S. Cl.
CPC ................ *F02C 7/04* (2013.01); *F01D 9/06* (2013.01); *F01D 25/00* (2013.01); *F01D 15/10* (2013.01);
(Continued)

(58) Field of Classification Search
CPC .... F02C 7/04; F02C 7/36; F02C 7/042; F02C 7/32; F02C 7/057; F02C 7/055;
(Continued)

(56) References Cited

U.S. PATENT DOCUMENTS 4,050,560 A   9/1977   Torstenfelt
4,077,748 A   3/1978   Potz
(Continued)

FOREIGN PATENT DOCUMENTS

DE   102012017918 A1   4/2014
WO      2012101087      8/2012

OTHER PUBLICATIONS

Kayara, U.S. Appl. No. 16/861,096, filed Apr. 28, 2020, for "Wind Funnel and Gas Combustion Turbine Systems with Controlled Air Feed".

(Continued)

*Primary Examiner* — Todd E Manahan
*Assistant Examiner* — Edwin Kang
(74) *Attorney, Agent, or Firm* — Alan G. Towner; Leech Tishman Fuscaldo & Lampl

(57) ABSTRACT

Wind funnel and gas combustion turbine systems are disclosed. Air travels through a wind funnel where it is compressed, and then flows into a compression section of a gas combustion turbine that is fueled by a hydrocarbon fuel source such as natural gas. Compressed air from the wind funnel may enter the compression section at selected locations. The compression section may have a front relatively low compression section and a downstream relatively higher compression section, and the compressed air from the wind funnel may be selectively delivered to one or both of the lower and higher compression sections. In addition, ambient air may be introduced into the lower compression section. During periods when compressed air from the wind funnel is delivered to the downstream higher compression section, the front lower compression section may be decoupled from the downstream section.

25 Claims, 13 Drawing Sheets

Related U.S. Application Data

(60) Provisional application No. 62/658,860, filed on Apr. 17, 2018.

(51) Int. Cl.

| | | |
|---|---|---|
| *F01D 9/06* | (2006.01) | |
| *F01D 25/00* | (2006.01) | |
| *F01D 17/08* | (2006.01) | |
| *F01D 25/32* | (2006.01) | |
| *F01D 15/10* | (2006.01) | |

(52) U.S. Cl.
CPC .......... *F01D 17/085* (2013.01); *F01D 25/32* (2013.01); *F05D 2220/32* (2013.01); *F05D 2220/74* (2013.01)

(58) Field of Classification Search
CPC .... F02C 7/05; F05D 2220/32; F05D 2220/74; F05D 2260/4023; F05D 2250/411; F01D 9/06; F01D 15/10; F01D 17/085
See application file for complete search history.

(56) References Cited

U.S. PATENT DOCUMENTS

| | | | |
|---|---|---|---|
| 4,347,706 A | 9/1982 | Drost | |
| 4,561,245 A | 12/1985 | Ball | |
| 5,009,569 A | 4/1991 | Hector, Sr. et al. | |
| 5,267,433 A | 12/1993 | Burch | |
| 5,562,190 A * | 10/1996 | McArthur | F16D 48/066 |
| | | | 192/48.3 |
| 5,694,765 A | 12/1997 | Hield et al. | |
| 6,732,529 B2 | 5/2004 | Anderson | |
| 6,952,058 B2 | 10/2005 | McCoin | |
| 6,981,839 B2 | 1/2006 | Fan | |
| 7,098,552 B2 | 8/2006 | McCoin | |
| 7,116,006 B2 | 10/2006 | McCoin | |
| 7,245,039 B2 | 7/2007 | Duhamel | |
| 7,368,828 B1 | 5/2008 | Calhoon | |
| 7,713,020 B2 | 5/2010 | Davidson et al. | |
| 7,811,048 B2 | 10/2010 | Allaei | |
| 7,821,153 B2 | 10/2010 | Gray et al. | |
| 7,872,366 B2 | 1/2011 | Gray et al. | |
| 7,875,992 B2 | 1/2011 | Gray et al. | |
| 7,948,109 B2 | 5/2011 | Gray et al. | |
| 8,084,880 B2 | 12/2011 | Botan et al. | |
| 8,089,173 B2 | 1/2012 | Freda | |
| 8,177,482 B2 | 5/2012 | Chio | |
| 8,178,990 B2 | 5/2012 | Freda | |
| 8,197,178 B1 | 6/2012 | Chen | |
| 8,197,200 B2 | 6/2012 | Holzhauer, Jr. | |
| 8,207,625 B1 | 6/2012 | Cristo | |
| 8,237,298 B2 | 8/2012 | Lemmers, Jr. | |
| 8,251,639 B2 | 8/2012 | Talan | |
| 8,341,964 B2 | 1/2013 | Finkenrath et al. | |
| 8,421,265 B2 | 4/2013 | Gray et al. | |
| 8,454,312 B2 | 6/2013 | Chen | |
| 8,791,588 B2 | 7/2014 | Steinlechner | |
| 8,821,117 B2 | 9/2014 | Churchill et al. | |
| 8,823,201 B1 | 9/2014 | Al-Wasis | |
| 8,834,093 B2 | 9/2014 | Cucci et al. | |
| 8,864,455 B2 | 10/2014 | Perry | |
| 8,881,534 B2 | 11/2014 | Copeland et al. | |
| 9,013,054 B1 | 4/2015 | Charnesky et al. | |
| 9,249,807 B2 | 2/2016 | Roter et al. | |
| 9,291,148 B2 | 3/2016 | Allaei | |
| 9,294,013 B2 | 3/2016 | Allaei | |
| 9,435,223 B2 | 9/2016 | Kim | |
| 9,546,644 B2 | 1/2017 | Oroza | |
| 9,567,856 B2 | 2/2017 | Faller | |
| 9,593,666 B2 | 3/2017 | Charnesky et al. | |
| 9,604,527 B2 | 3/2017 | Manente | |
| 9,631,601 B2 | 4/2017 | Reitz | |
| 9,631,604 B2 | 4/2017 | Allegretti | |
| 9,651,018 B2 | 5/2017 | Vorias | |
| 9,670,899 B2 | 6/2017 | Steinlechner | |
| 9,835,133 B2 | 12/2017 | Al-Garni et al. | |
| 9,856,853 B2 | 1/2018 | French | |
| 9,885,340 B2 | 2/2018 | Powell | |
| 9,991,763 B1 | 6/2018 | Downs et al. | |
| 10,669,935 B2 * | 6/2020 | Kayara | F01D 9/06 |
| 2008/0061559 A1 | 3/2008 | Hirshberg | |
| 2009/0160195 A1 | 6/2009 | Culjak | |
| 2010/0123317 A1 | 5/2010 | Leijon et al. | |
| 2010/0215558 A1 | 8/2010 | Kraemer | |
| 2012/0003077 A1 | 1/2012 | Churchill | |
| 2012/0060552 A1 | 3/2012 | Van De Lisdonk et al. | |
| 2012/0087787 A1 | 4/2012 | Brown | |
| 2012/0141249 A1 | 6/2012 | Carlson | |
| 2013/0061597 A1 | 3/2013 | Chillar et al. | |
| 2014/0123674 A1 | 5/2014 | Hao et al. | |
| 2014/0159376 A1 | 6/2014 | Botelho | |
| 2015/0040578 A1 | 2/2015 | Betti et al. | |
| 2015/0047314 A1 * | 2/2015 | Benz | F02C 7/04 |
| | | | 60/39.52 |
| 2015/0108758 A1 | 4/2015 | Oakes et al. | |
| 2015/0152849 A1 | 6/2015 | Allaei | |
| 2015/0184593 A1 | 7/2015 | Kraft et al. | |
| 2015/0300254 A1 * | 10/2015 | Stretton | F02C 7/05 |
| | | | 137/15.1 |
| 2015/0322819 A1 | 11/2015 | French | |
| 2015/0361953 A1 | 12/2015 | Freese et al. | |
| 2016/0017862 A1 | 1/2016 | Allaei | |
| 2016/0040605 A1 * | 2/2016 | Howarth | F02C 9/18 |
| | | | 60/782 |
| 2016/0186718 A1 | 6/2016 | Allaei | |
| 2016/0186726 A1 | 6/2016 | Allaei | |
| 2016/0298595 A1 | 10/2016 | Kim | |
| 2016/0376956 A1 * | 12/2016 | Kulkarni | F01N 3/05 |
| | | | 60/39.5 |
| 2016/0376961 A1 * | 12/2016 | Kulkarni | F01N 3/05 |
| | | | 60/39.5 |
| 2016/0376994 A1 * | 12/2016 | Kulkarni | F02C 3/04 |
| | | | 60/39.5 |
| 2017/0096945 A1 * | 4/2017 | Mueller | F04D 29/325 |
| 2017/0191500 A1 * | 7/2017 | Lobocki | F02C 7/04 |
| 2017/0314471 A1 * | 11/2017 | Sennoun | F02C 7/06 |
| 2017/0321700 A1 * | 11/2017 | Merchant | F02C 7/04 |
| 2018/0023545 A1 | 1/2018 | Walden, Sr. et al. | |
| 2019/0316520 A1 | 10/2019 | Kayara | |

OTHER PUBLICATIONS

Kayara, U.S. Appl. No. 16/861,122, filed Apr. 28, 2020, for "Wind Funnel, Gas Combustion Turbine and Power Output Generator Systems".

Zalud, "Gears Put a New Spin on Turbofan Performance", 1998, Machine Design, 5 pages.

* cited by examiner

WIND FUNNEL AND GAS COMBUSTION TURBINE SYSTEMS INCLUDING COMPRESSION SECTIONS

CROSS REFERENCE TO RELATED APPLICATIONS

This application is a continuation of U.S. patent application Ser. No. 16/386,451 filed Apr. 17, 2019, which claims priority from U.S. Provisional Patent Application No. 62/658,860, filed on Apr. 17, 2018, both of which are incorporated herein by reference.

FIELD OF THE INVENTION

The present invention relates to wind-funneling for gas turbines having compression sections.

BACKGROUND INFORMATION

Conventional gas turbines consume large quantities of air for natural gas or other hydrocarbons to combust in a confined space. Combustion causes the turbine shaft to spin in a back expansion section of the turbine, and flaps in the front end compressor of the turbine concentrate the weight of the air. For example, a conventional aero-derivative turbine may concentrate air from about 20 cubic meters to 1 cubic meter per second in the combustion area of a natural gas turbine where natural gas is injected and ignited. However, such compression of normal density air results in significant energy loss.

SUMMARY OF THE INVENTION

Wind funnel and gas combustion turbine systems are provided. Air travels through a wind funnel where it is compressed, and then flows into a compression section of a gas combustion turbine that is fueled by a hydrocarbon fuel source such as natural gas. Compressed air from the wind funnel may enter the compression section at selected locations. The compression section may have a front relatively low compression section and a downstream relatively higher compression section, and the compressed air from the wind funnel may be selectively delivered to one or both of the lower and higher compression sections. In addition, ambient air may be introduced into the lower compression section. During periods when compressed air from the wind funnel is delivered to the downstream higher compression section, the front lower compression section may be decoupled from the downstream section.

An aspect of the present invention is to provide a wind funnel and gas combustion turbine system comprising: a wind funnel including an inlet opening having a cross-sectional area and an outlet opening having a cross-sectional area less than the cross-sectional area of the inlet opening, wherein the wind funnel is inwardly tapered between the inlet opening and the outlet opening; and a stationary gas combustion turbine in flow communication with the wind funnel. The wind funnel is structured and arranged to receive air from a wind source through the inlet opening and to discharge compressed air from the outlet opening for delivery to a compression section of the gas combustion turbine. The compressed air from the wind funnel is introduced into the compression section of the gas combustion turbine downstream from a first row of rotatable blades attached to a rotatable turbine shaft in the compression section.

Another aspect of the present invention is to provide a wind funnel and gas combustion turbine system comprising: a wind funnel including an inlet opening having a cross-sectional area and an outlet opening having a cross-sectional area less than the cross-sectional area of the inlet opening, wherein the wind funnel is inwardly tapered between the inlet opening and the outlet opening; and a stationary gas combustion turbine in flow communication with the wind funnel. The wind funnel is structured and arranged to receive air from a wind source through the inlet opening and to discharge compressed air from the outlet opening for delivery to a compression section of the gas combustion turbine. The compression section comprises a low compression section and a medium compression section, and the compressed air from the wind funnel is selectively introduced alternatively into the low compression section and into the medium compression section.

A further aspect of the present invention is to provide a wind funnel and gas combustion turbine system comprising: a wind funnel comprising an inlet opening having a cross-sectional area and an outlet opening having a cross-sectional area less than the cross-sectional area of the inlet opening, wherein the wind funnel is inwardly tapered between the inlet opening and the outlet opening; and a stationary gas combustion turbine in flow communication with the wind funnel. The wind funnel is structured and arranged to receive air from a wind source through the inlet opening and to discharge compressed air from the outlet opening for delivery to a compression section of the gas combustion turbine The gas compression section comprises a first compression section including an output shaft, a second compression section including an input shaft, and a turbine coupling mechanism structured and arranged to selectively engage and disengage the output and input shafts to thereby engage and disengage the first and second compression sections from each other.

Another aspect of the present invention is to provide a method of operating a wind funnel and gas combustion turbine system. The method comprises feeding compressed air from the wind funnel to a compression section of a stationary gas combustion turbine, and combusting fuel in the gas combustion turbine in the presence of oxygen supplied from the compressed air. The wind funnel comprises: an inlet opening having a cross-sectional area; an outlet opening having a cross-sectional area less than the cross-sectional area of the inlet opening; and a sidewall tapered inwardly from the inlet opening toward the outlet opening. The compressed air from the wind funnel is introduced into the compression section of the gas combustion turbine downstream from a first row of rotatable blades attached to a rotatable turbine shaft in the compression section.

These and other aspects of the present invention will be more apparent from the following description.

DETAILED DESCRIPTION

Figure 1:
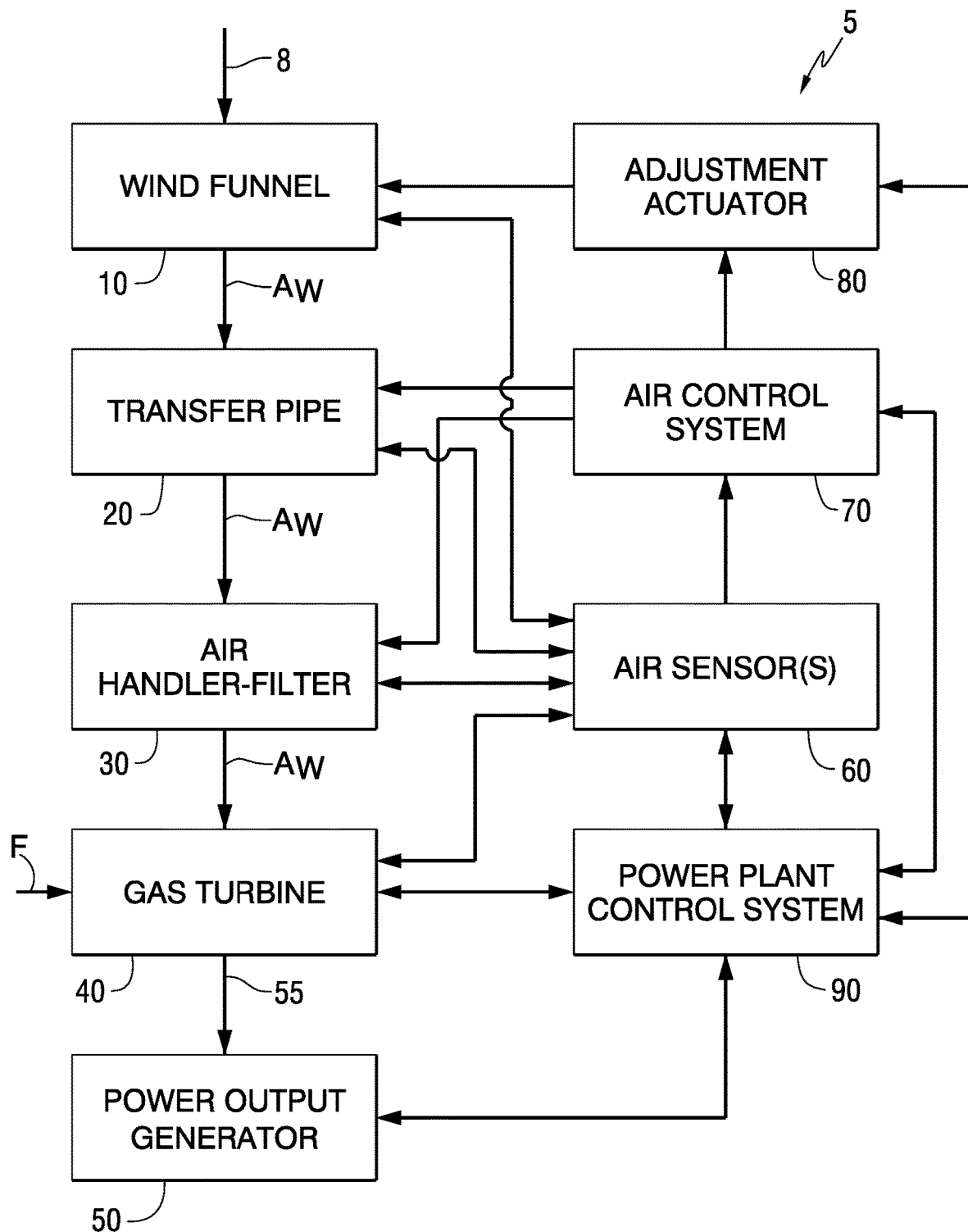
FIG. 1 is a schematic flow diagram illustrating features of a wind-funneling system for gas turbines in accordance with an embodiment of the present invention.

FIG. 1 schematically illustrates a wind funnel and gas turbine system 5 in accordance with an embodiment of the present invention. A wind funnel 10, as more fully described below, communicates with a transfer pipe 20 which communicates with an air handler and filter 30 which, in turn, communicates with a gas turbine and generator 40. Hydrocarbon fuel F is fed to the gas turbine 40. As more fully described below, the wind funnel 10 generates compressed air $A_w$ that is fed into the gas turbine 40. The air handler 30 may be of any conventional design known to those skilled in the art. The gas turbine 40 provides power to an output generator 50 through a driven shaft 55.

As used herein, the terms "gas turbine" and "gas combustion turbine" mean gas turbines that utilize combustible fuels such as natural gas or other hydrocarbons such as methane, ethane, propane, oil, diesel, ethanol, petroleum distillates, naptha, and coke oven gas to generate electrical power. Typical gas turbines include a compression section, a combustion section and an expansion section. In the compression section, multiple rows of turbine blades are mounted on a rotatable turbine shaft. The turbine shaft extends through the compression, combustion and expansion sections. Multiple rows of turbine blades may be mounted on the turbine shaft in the expansion section of the gas turbine.

In certain embodiments, the gas turbine 40 may comprise a natural gas turbine with any suitable power output. For example, power outputs of from 1 to 600 MW, or from 10 to 100 MW, or from 15 to 50 MW. Examples of commercially available natural gas turbines include turbines sold under Model Nos. LM 2500, TM 2500 and LM 6000 sold by General Electric Corporation, Model Nos. SGTS-8000H, SGT 500 and SGT 800 sold by Siemens Corporation, and Model Nos. M701J and M701F5 sold by Mitsubishi Hitachi Power Systems Corporation.

In accordance with embodiments of the present invention, the efficiency of gas turbines, such as those described above, can be increased significantly due to the controlled supply of compressed air from an air funnel to the compression section of a gas turbine. As used herein, the term "increased efficiency" when referring to the operation of a gas turbine means the percentage decrease in the amount of hydrocarbon fuel F that is consumed during operation of the gas turbine for a given power output level due to the supply of compressed air from an air funnel. For gas turbines, the amount of hydrocarbon consumed during operation may be described in units of kg/MW hour, or kg/hour for a given power output, e.g., 1 MegaWatt.

In accordance with embodiments of the present invention, compressed air from at least one wind funnel flows from the compression section of the gas turbine to the combustion section, where oxygen in the compressed air is used to combust the hydrocarbon fuel in the combustion section of the gas turbine.

As further shown in FIG. 1, the wind funnel and gas turbine system 5 may include at least one air sensor module 60 for receiving sensed parameters at or near the wind funnel 10, such as wind speed, wind direction, temperature, barometric pressure and the like and/or for receiving sensed parameters at or near the gas turbine 40, such as air pressure temperature, humidity and direction at the compression, combustion and expansion sections of the turbine. The system may include a controller 70 into which signals from the air sensor module 60 are fed. An adjustment actuator 80 may be used to control the orientation of the wind funnel 10.

The controller 70 may send input signals to a power plant control system, which then controls the operation of the natural gas turbine 40, transfer pipe 20 and/or adjustment actuator 80. In certain embodiments, the controller 70 may send input signals to the adjustment actuator 80, which may be used to change the orientation of the wind funnel 10, as more fully described below.

In the system shown in FIG. 1, the air sensor module 60, air control system 70, adjustment actuator 80 and wind funnel 10 operate together as follows: the air sensor module 60 may detect air speed, temperature and/or density of currents near the opening of the wind funnel 10 and/or inside the wind funnel 10. Such information may be sent to the power plant control system 90, which makes decisions as to the composition of the air desired and conveys those orders to the air control system 70, which may take additional data from the air sensor module 60. The air control system 70 may make mechanical decisions as to air flow, and may use the adjustment actuator 80 to control which direction the wind funnel 10 faces for optimum air intake. The air control system 70 may also have the ability to manipulate the compressed air handler-filter 30, and any additional ambient air handler-filter 130 as described below, as well as the transfer pipe 20.

Figure 2:
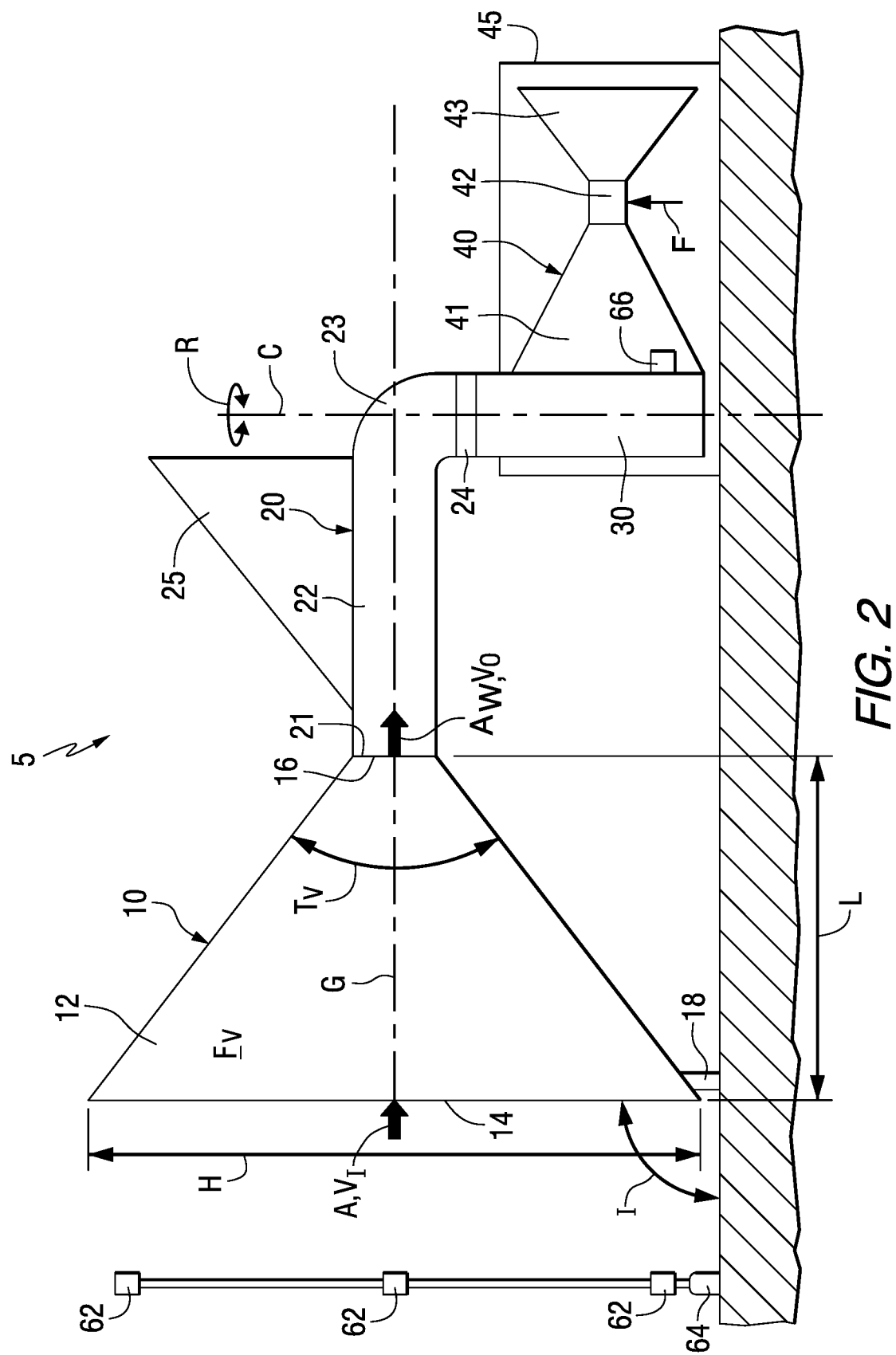
FIG. 2 is a partially schematic side view of a wind funnel and gas turbine system in accordance with an embodiment of the present invention corresponding to the system of FIG. 1.
Figure 3:
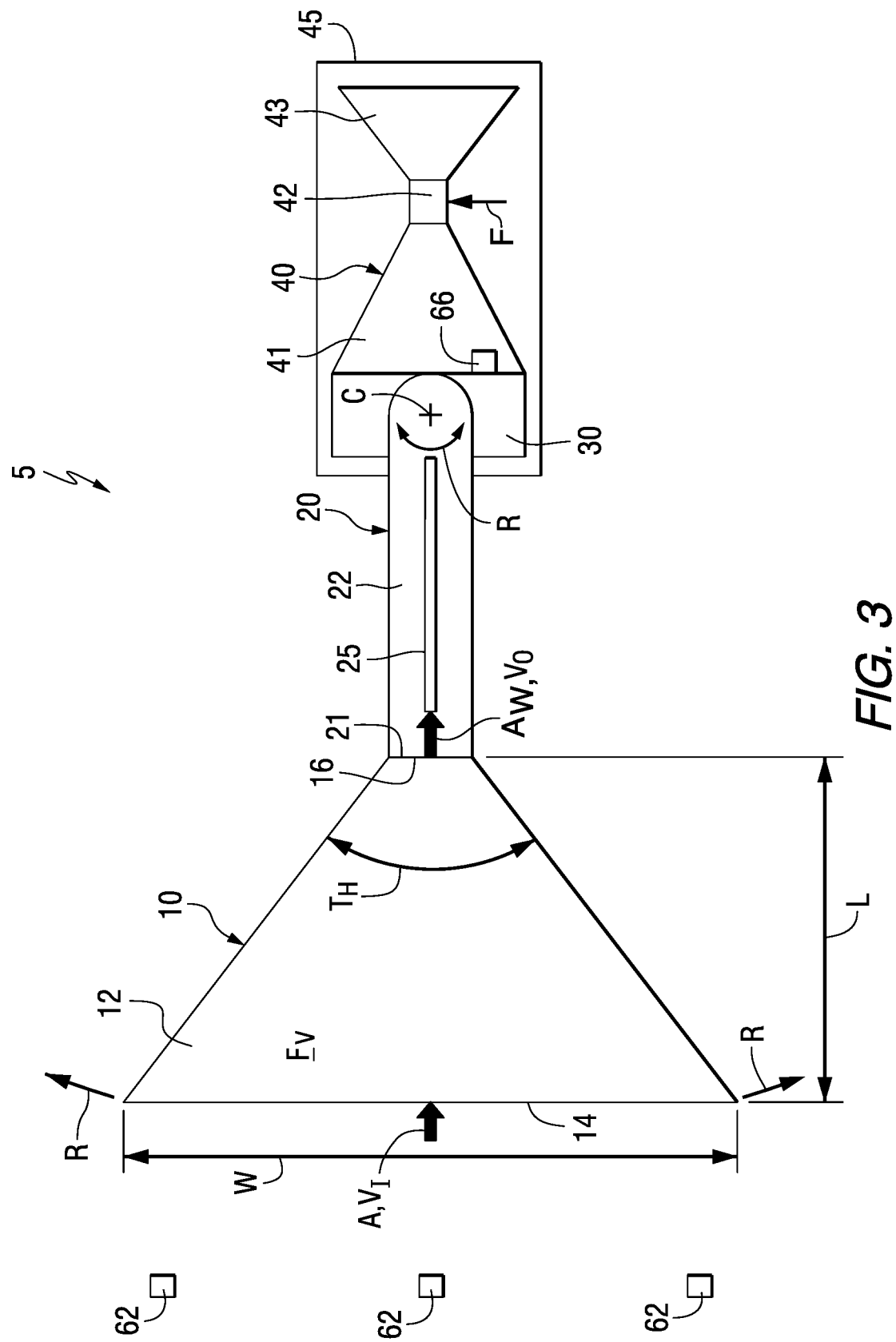
FIG. 3 is a partially schematic top view of a wind funnel and gas turbine system in accordance with an embodiment of the present invention corresponding to the system of FIG. 1.

FIG. 2 is a partially schematic side view and FIG. 3 is a partially schematic top view of a wind funnel and natural gas turbine system 5 in accordance with an embodiment of the present invention. The system 5 includes a wind funnel 10 having a tapered body 12, inlet opening 14, and outlet opening 16. As shown in FIG. 2, a support member 18 may be used to support the wind funnel 10 on the ground or floor. The support member 18 may be of any suitable design, such as a wheel or roller that may roll on the ground or on a track, such as that shown in FIG. 6 and described below, to provide up to 360° rotation of the wind funnel in a substantially horizontal plane.

An array of air sensors 62 is positioned adjacent to the wind funnel 10, and may be supported by any suitable structure, such as the base support member 64 shown in FIG. 2 or any other suitable structure, e.g., a metal cable (not shown) extending across the inlet opening 12 or mouth of the wind funnel 10. The sensors 62 may be equipped with power and data from the sensors 62 may be transmitted by wire or wirelessly to the air sensor module 60. Each wind funnel 10 may have its own air sensors 62, e.g., mounted on metal cables. A farm of wind funnels may be provided, having their own area of wind, temperature and humidity sensors, e.g., on poles in four corners of a wind farm transmitting data back to the air sensor module 60.

The wind funnel and natural gas turbine system 5 also includes a transfer pipe 20 having an inlet 21, body 22 and elbow 23. A rotation joint 24 may be used to connect the body and elbow 22 and 23 of the transfer pipe 20 to a turbine inlet air handler and filter 30. The transfer pipe 20 and wind funnel 10 are thus rotatable 360° in a substantially horizontal plane through the use of the rotation joint and support member 18. The transfer pipe 20 may have any suitable cross-sectional shape, such as circular, square, rectangular or the like. The transfer pipe 20 may be located above ground as shown in FIGS. 2 and 3, or at least a portion of the transfer pipe 20 may be located below ground. A directional vane 25 may be mounted on the body 22 of the transfer pipe 20 or on the wind funnel 10 to facilitate alignment of the wind funnel 10 with the prevailing wind direction. The directional vane 25 may be of any suitable construction, such as a plastic or metal sheet, or a flexible fabric fastened to an angled metal pole at the leading edge of the vane 25.

As further shown in FIGS. 2 and 3, the wind funnel and natural gas turbine system 5 includes a natural gas turbine 40 having a compression section 41, combustion section 42 and expansion section 43, as known to those skilled in the art. The natural gas turbine 40 may be located inside a housing 45 that rests on the ground or floor. The wind funnel 10 and transfer pipe 20 may rotate around a central rotational axis C to produce rotational movement R. Although the transfer pipe 20 shown in FIGS. 2 and 3 is illustrated as rotating R around a central axis C located at the gas turbine 40, any other suitable location of the central axis C may be used, e.g., away from the gas turbine 40.

At least one sensor 66 may be located in or near the gas turbine 40 and communicates with the sensor module 60. For example, at least one sensor 66 may be provided at the compression section 41 and/or at the combustion section 42 and/or at the expansion section 43 for detecting parameters such as air pressure, gas pressure, gas flow velocity, gas flow direction, temperature, humidity and the like.

As shown in the side view of FIG. 2, the wind funnel 10 is inwardly tapered between the inlet opening 14 and the outlet opening 16 at a vertical taper angle $T_V$, which is measured in a vertical plane. As further shown in FIG. 2, the inlet opening 14 of the wind funnel 10 is oriented at an inclination angle I measured from a horizontal plane. As further shown in FIG. 2, the inlet opening 14 of the wind funnel 10 has a height H. A horizontal or ground plane G is labeled in FIG. 2.

As shown in the top view of FIG. 3, the wind funnel 10 has a horizontal taper angle $T_H$ between the inlet opening 14 and outlet opening 16, which is measured in a horizontal plane. As further shown in FIG. 3, the inlet opening 14 of the wind funnel 12 has a width W. As shown in FIGS. 2 and 3, the wind funnel 10 has a length L measured between the inlet opening 14 and outlet opening 16.

In accordance with embodiments of the present invention, the vertical taper angle $T_V$ shown in FIG. 2 may typically range from 20 to 120°, for example, from 30 to 90°, or from 35 to 70°, or from 45 to 65°.

In accordance with embodiments of the present invention, the horizontal taper angle $T_H$ shown in FIG. 3 may typically range from 30 to 120°, for example, from 45 to 100°, or from 60 to 90°.

In certain embodiments, the ratio of the vertical taper angle to horizontal taper angle $T_V$:$T_H$ may typically range from 1:4 to 3:1, for example, from 1:3 to 2:1, or from 1:2 to 1:1.

In accordance with embodiments of the present invention, the inclination angle I shown in FIG. 2 may typically range from 75 to 120°, for example, from 80 to 100°, or from 85 to 95°. In certain embodiments, the inclination angle I is 90°. However, any other suitable inclination angle may be used.

In accordance with certain embodiments, the height H of the wind funnel inlet opening 14 shown in FIG. 2 may typically range from 5 to 300 meters, for example, from 10 to 150 meters, or from 20 to 120 meters. However, any other suitable height H may be used, e.g., based on land availability, topography and the like.

In accordance with certain embodiments, the width W of the wind funnel inlet opening 14 shown in FIG. 3 may typically range from 5 to 300 meters, for example, from 10 to 150 meters, or from 20 to 120 meters. However, any other suitable width W may be used.

In accordance with certain embodiments, the length L of the wind funnel inlet opening 14 as shown in FIGS. 2 and 3 may typically range from 5 to 300 meters, for example, from 10 to 150 meters, or from 20 to 120 meters.

In certain embodiments, the ratio of the height to length H:L may typically range from 1:3 to 3:1, for example, from 1:2 to 2:1, or from 1:1.5 to 1.5:1.

In certain embodiments, the ratio of the width to length W:L may range from 1:3 to 3:1, for example, from 1:2 to 2:1, or from 1:1.5 to 1.5:1.

In certain embodiments, the height H and the width W may be the same. Alternatively, the height H and width W may be different. For example, the height to width ratio H:W may range from 1:3 to 3:1, for example, from 1:2 to 2:1, or from 1:1.5 to 1.5:1.

In accordance with the present invention, the inlet opening has a cross-sectional area $A_I$ larger than a cross-sectional area $A_O$ of the outlet opening. In certain embodiments, the cross-sectional area ratio $A_I:A_O$ may typically range from 3:1 to 80,000:1, for example, from 5:1 to 10,000:1, or from 10:1 to 5,000:1, or from 20:1 to 1,000:1.

The wind funnel 10 has an internal volume $F_V$ that may typically range from 1,000 to 15,000,000 m$^3$, for example, from 10,000 to 12,000,000 m$^3$, or from 100,000 to 5,000,000 m$^3$. In certain embodiments, the internal volume $F_V$ of the wind funnel 10 may be selected depending upon the power output of the natural gas turbine 40 in MW, e.g., the ratio of $F_V$:MW may typically range from 10,000:1 to 200,000:1, for example, from 50,000:1 to 100,000:1, or from 55,000:1 to 85,000:1. While the use of a single wind funnel 10 is primarily described herein, it is to be understood that two or more wind funnels may be used in combination to feed a single gas turbine.

Factors to consider when selecting the size and configuration of the wind funnel(s) 10 include: availability of land around the power plant allow the wind funnel 10 to circle around one turbine or to circle around a specific point to capture the compressed wind and then transport it to the turbine by pipe; topography and relative location of the power plant to concentrating wind funnels that surround it; height above sea level to determine air density for time period when it is used; time of day wind speed average; ambient temperature of the time period when the wind power will occur; and/or specific turbine size.

As further shown in FIGS. 2 and 3, ambient wind A may enter the inlet opening 14 of the wind funnel 10 at an air velocity $V_I$, and compressed air $A_w$ exits through the outlet opening at an air velocity $V_O$. In certain embodiments, the outlet to inlet air velocity ratio $V_O:V_I$ may range from 1.5:1 to 100:1, for example, from 2:1 to 50:1, or from 5:1 to 20:1.

The air pressure at the outlet $P_O$ of the wind funnel 10 is greater than the ambient air pressure $P_I$ at the inlet of the wind funnel, e.g., the ratio of $P_O:P_I$ may typically range from 1.1:1 to 10:1, for example, from 1.2:1 to 5:1, or from 1.5:1 to 3:1.

Figure 4:
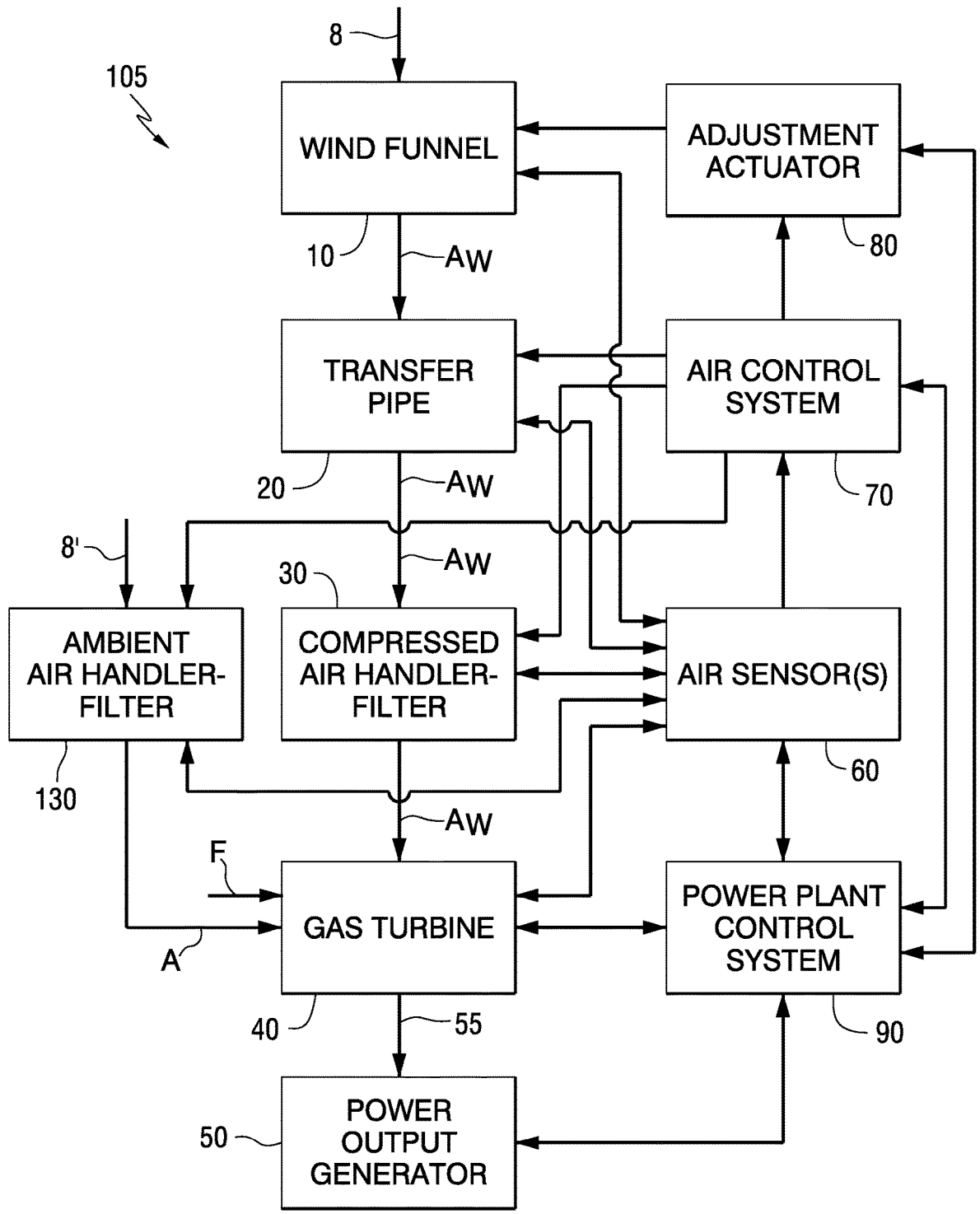
FIG. 4 is a schematic flow diagram illustrating features of a wind-funneling system for gas turbines in accordance with another embodiment of the invention.
Figure 5:
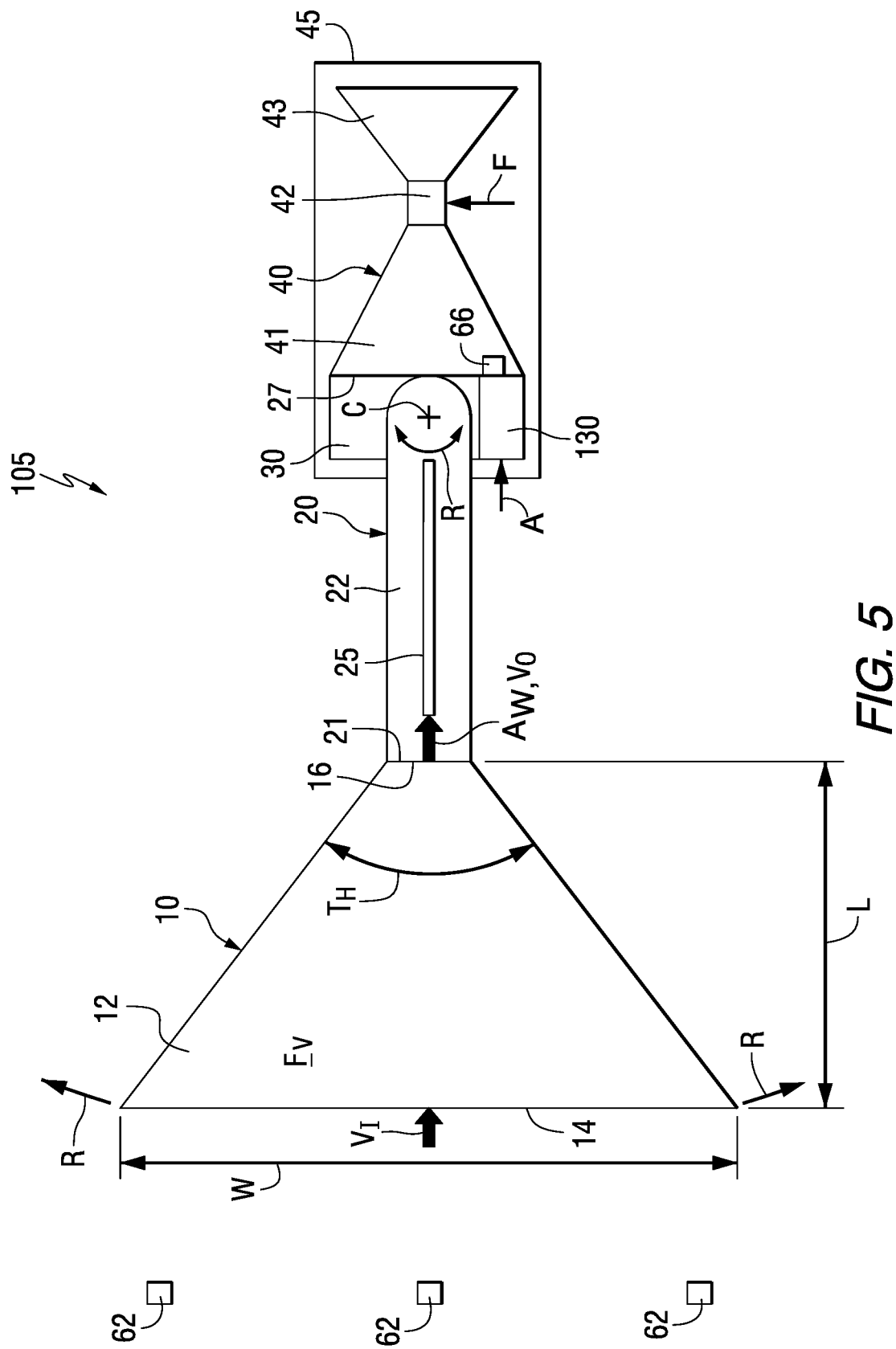
FIG. 5 is a partially schematic top view of a wind funnel and gas turbine system in accordance with an embodiment of the invention corresponding to FIG. 4.

FIG. 4 is a schematic flow diagram illustrating a wind funnel and gas turbine system 105 in accordance with another embodiment of the present invention. FIG. 5 is a partially schematic top view of wind funnel and gas turbine system 105 in accordance with the embodiment of FIG. 4. Similar reference numbers are used to label similar elements in the embodiment of FIGS. 4 and 5 as used in the embodiment of FIGS. 1-3.

As shown in FIG. 4, the wind funnel and gas turbine system 105 includes a wind funnel 10, transfer pipe 20, compressed air handler-filter 30, gas turbine 40, driven shaft 55, output power generator 50, air sensor 60, air control system 70, adjustment actuator 80, and power plant control system 90, similar to the embodiment shown in FIGS. 1-3. Hydrocarbon fuel F is fed to the gas turbine 40. Compressed air $A_w$ from the wind funnel 10 is fed to the gas turbine 40.

In addition, the wind funnel and gas turbine system 105 of FIG. 4 includes an ambient air handler-filter 130 that receives ambient air 8' for delivery to the gas turbine 40. The ambient air handler-filter 130 may be of any conventional design known to those skilled in the art. Thus, in the embodiment shown in FIG. 4, separate compressed air $A_w$ and ambient air A sources are provided. As more fully described below, the wind funnel and gas turbine system 105 shown in FIG. 4 may be selectively operated to supply compressed air $A_w$ from the wind funnel 10 and transfer pipe 20 through the compressed air handler-filter 30 into the gas turbine 40, to supply ambient air A from the ambient handler-filter 130 into the gas turbine 40, or a combination thereof.

As shown in FIGS. 4 and 5, the wind funnel and gas turbine system 105 includes similar components as the embodiment illustrated in FIGS. 2 and 3, with a separate compressed air $A_w$ handler-filter 30 and ambient air A handler-filter 130 feeding into the gas turbine 40. The compressed and ambient air handler-filters 30 and 130 may be of any conventional design known to those skilled in the art.

The wind funnel and gas turbines system 105 shown in FIG. 5 may operate as follows. The power plant control system 90 controls the actuator 80 and air control system 70. By using information from the air sensor module 60 and air sensors 62 and 66, the power plant control system 90 can extract the lowest cost power from the gas turbine 40. Operational possibilities include: (1) if the power plant control system 90 receives information from the air sensor system 60 that there is enough compressed air available, it would first give priority to the source of compressed air and send it to a low compressor section front end of the turbine by commanding air control system 70 to manipulate compressed air handler 30, or the high pressure compressed air with high velocity may be directed to a medium compressor section or high compressor section of the front end of the turbine; (2) if the air sensor system module 60 detects that there is not enough compressed air $A_w$ from the wind funnel 10, transfer pipe 20 and compressed air handler 30, it would inform the power plant control system 90 of this, and the power plant control system 90 will instruct the air control system 70 to supplement air from ambient air A handler 130; (3) if the wind is dead, the air sensor module 60 informs the power plant control system 90 of this, and the power plant control system 90 commands the air control system 70 to operate normally and pull all necessary air in through ambient air handler 130 into gas turbine 40; (4) if the wind has changed direction it operates similar to number (3) above and at the same time the power plant control system 90 sends orders to the adjustment actuator 80 to change the direction the wind funnel 10 is facing in order to capture the maximum wind power.

Figure 6:
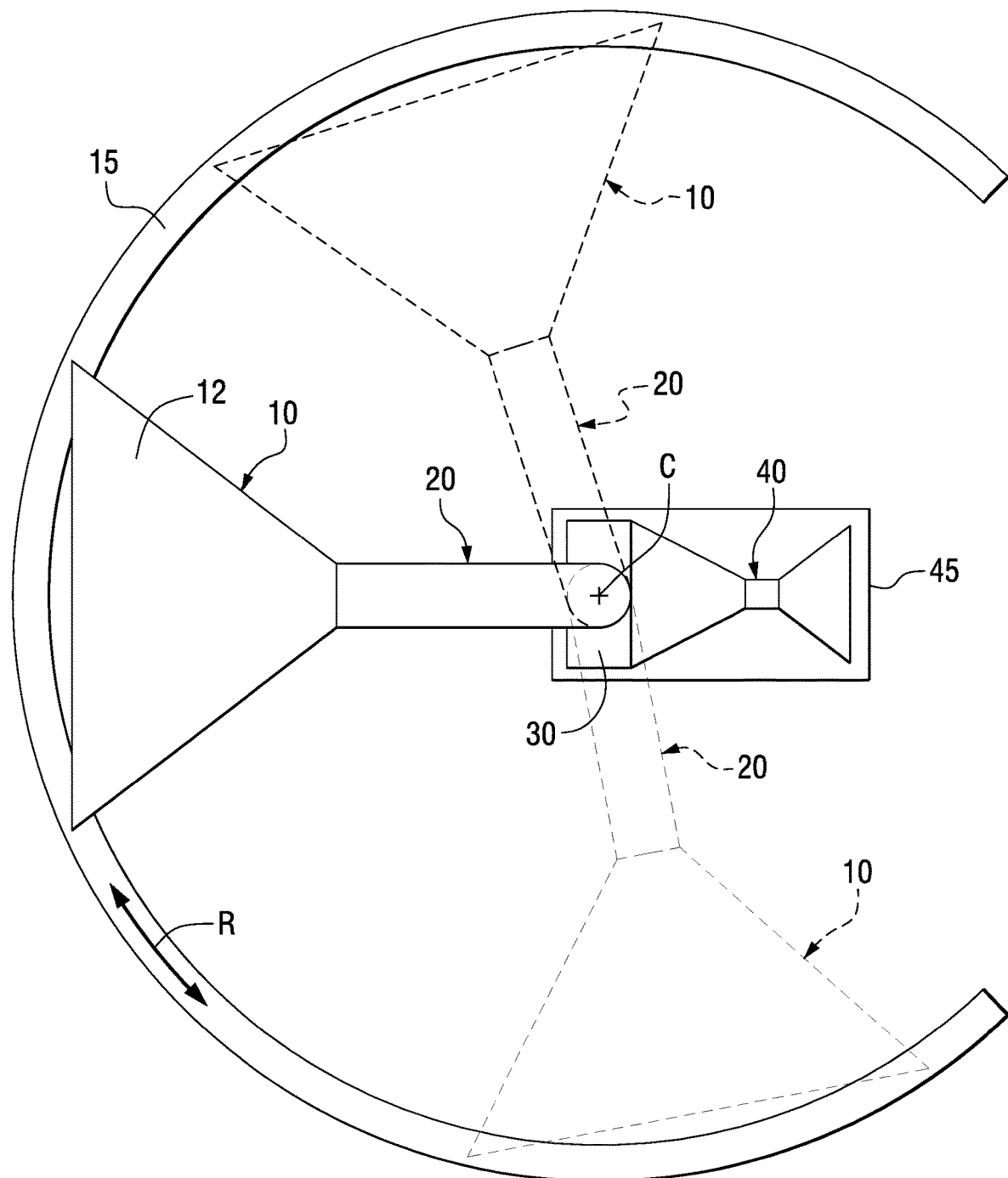
FIG. 6 is a partially schematic top view of a wind-funneling system for gas turbines illustrating rotation of a wind funnel on a circular track into multiple orientations in accordance with an embodiment of the present invention.

As shown in FIG. 6, the transfer pipe 20, and the attached wind funnel 10, may rotate R around the central rotational axis C in order to adjust the orientation of the wind funnel 10. For example, if the direction of the prevailing wind changes, the wind funnel 10 may be pivoted into a position in which the prevailing wind meets the inlet opening 14 head on in order to maximize the inlet opening air velocity $V_I$ during operation. The directional vane 25 may be used to align the wind funnel 10 with the prevailing wind direction. While the natural gas turbine 40 and housing 45 may remain in a stationary position, the wind funnel 10 may be selectively rotated in an arc of up to 360° in order to maximize the inlet opening air velocity $V_I$. Although a full rotational movement R of 360° is within the scope of the present invention, the arc transversed by the rotational movement may be less than 360° in certain embodiments, for example, 270° or 180°.

In the embodiment shown in FIG. 6, the wind funnel 10 and its support members 18 may be supported and guided along a circular track 15, which in the embodiment shown extends in a 270° arc around the central rotational axis C. For example, the track 15 may comprise two railroad tracks that each support two metal or polymeric roller wheels for a total of four wheels for each support member 18.

Although in the embodiment shown in FIGS. 2, 3, 5 and 6, the wind funnel 10 and transfer pipe 20 are shown as being fixed together, it is to be understood that an articulated joint (not shown) between the wind funnel 10 and transfer pipe 20 may be used in addition to, or in place of, the central rotational axis C and rotation joint 24 illustrated in the figures. In addition, any other suitable mounting mechanism or configuration may be used in accordance with the present invention that allows control of the wind funnel orientation while maintaining air flow communication between the wind funnel and the turbine inlet filter 30 or natural gas turbine 40.

In accordance with certain embodiments, the turbine inlet filter 30 may be of any suitable conventional design, such as turbine inlet filters included with natural gas turbine assemblies sold by General Electric Corporation, Siemens Corporation and Mitsubishi Corporation.

In accordance with embodiments of the present invention, the configuration of the transfer pipe 20 may be controlled based upon the particular configuration of the upstream wind funnel 10 and/or the configuration of the downstream turbine inlet filter 30 and natural gas turbine 40. For example, the cross-sectional shape and size of the transfer pipe 20 may be controlled, the overall length of the transfer pipe may be controlled, and the shape and dimensions of all the longitudinal length of the transfer pipe 20 may be controlled. In certain embodiments, the inlet 21 of the transfer pipe 20 substantially matches the outlet opening 16 of the wind funnel 10. Thus, the cross-sectional shapes and dimensions may be matched. However, in other embodiments, the inlet 21 of the transfer pipe 20 may not match the outlet opening 16 of the wind funnel 10.

In the embodiment shown in FIGS. 2, 3 and 5, the transfer pipe 20 may have an inner diameter defining a cross-sectional area similar to the cross-sectional area $A_O$ of the outlet opening. In certain embodiments, the cross-sectional area of the transfer pipe 20 is maintained substantially constant along the longitudinal length of the transfer pipe 20. However, in other embodiments, the cross-sectional area of the transfer pipe 20 may vary along its length, e.g., the transfer pipe 20 may taper inwardly slightly from its inlet to its outlet.

The transfer pipe 20 may be provided in any suitable length. For example, the overall length of the transfer pipe 20 may be minimized in order to reduce air friction, pressure drops or deceleration of the air as it passes through the transfer pipe 20. The transfer pipe 20 may have a circular cross section, or any other desired shape such as square, etc.

In certain embodiments as shown in FIGS. 2, 3 and 5, the length of the transfer pipe 20 and shape of the wind funnel 10 are controlled in order to provide sufficient clearance space for the transfer pipe 20 and wind funnel 10 to rotate over and past the housing 45 of the natural gas turbine 40 without being obstructed. Alternative wind funnel and/or transfer pipe configurations may be provided to ensure sufficient clearance during rotation, for example, a flat-bottom wind funnel 10a such as shown in the embodiment of FIG. 7 may be used to provide additional clearance as the wind funnel rotates above the turbine housing 45.

Figure 7:
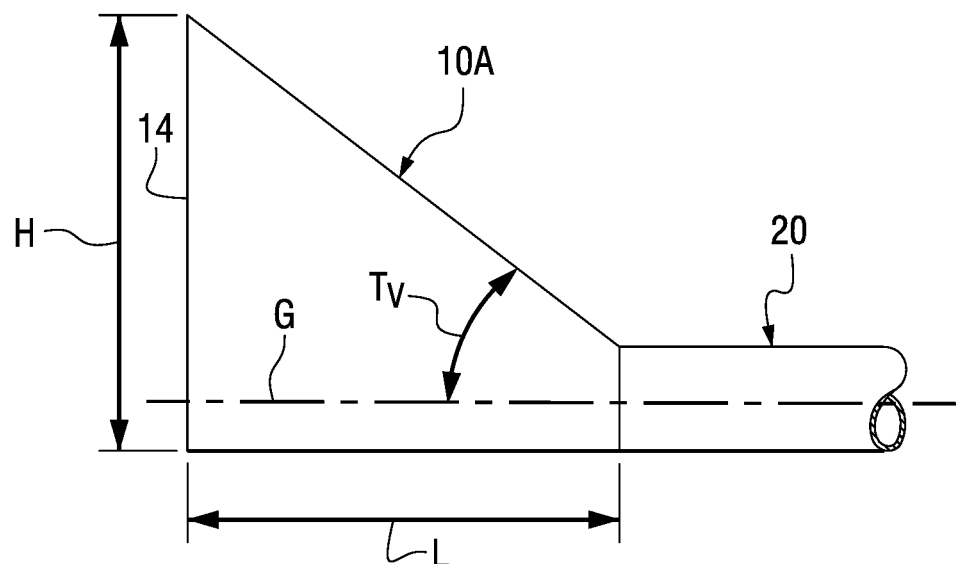
FIG. 7 is a partially schematic side view of a wind funnel in accordance with an embodiment of the present invention.
Figure 8:
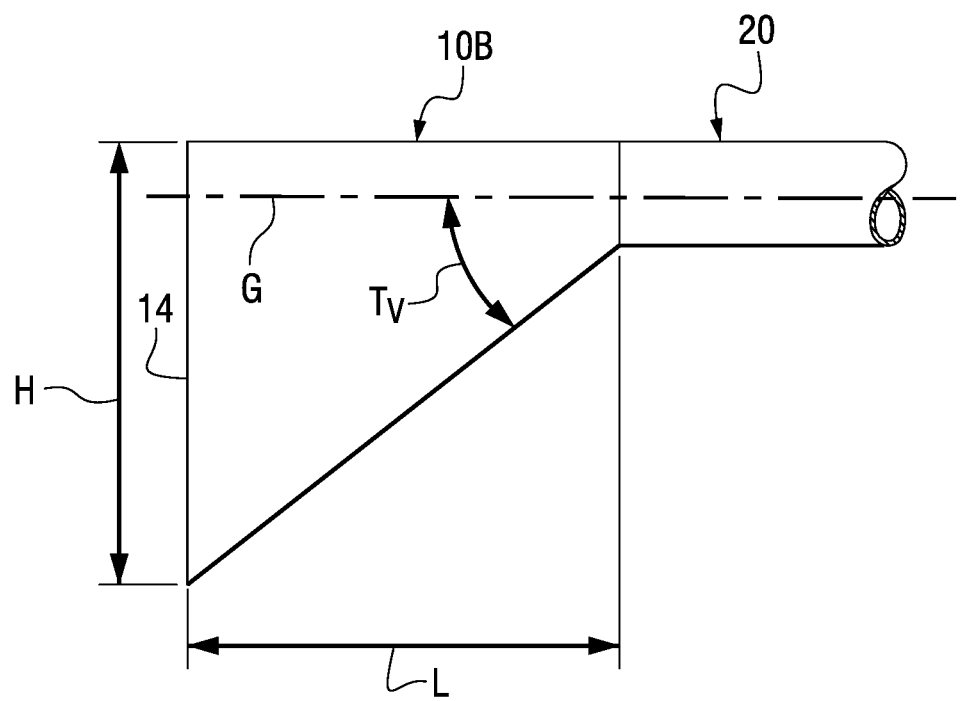
FIG. 8 is a partially schematic side view of a wind funnel in accordance with another embodiment of the present invention.

FIGS. 7 and 8 are side views of alternative wind funnel configurations in accordance with embodiments of the invention. In FIG. 7, the wind funnel 10A has a lower surface that is substantially parallel with the horizontal plane G. The vertical taper angle $T_V$ thus extends from the substantially horizontal bottom surface to the angled upper surface of the wind funnel 10A. In FIG. 8, the wind funnel 10B has an upper surface that is substantially parallel with the horizontal plane G and an angled lower surface. In this embodiment, the vertical taper angle $T_V$ is measured from the upper substantially horizontal surface to the lower angled surface. In each of the embodiments shown in FIGS. 7 and 8, the vertical taper angle $T_V$ may fall within the vertical taper angle $T_V$ ranges described above in connection with the embodiment shown in FIG. 2.

FIGS. 9-13 are partially schematic end views of wind funnels 10 having various types of cross-sectional shapes in accordance with embodiments of the invention.

Figure 9:
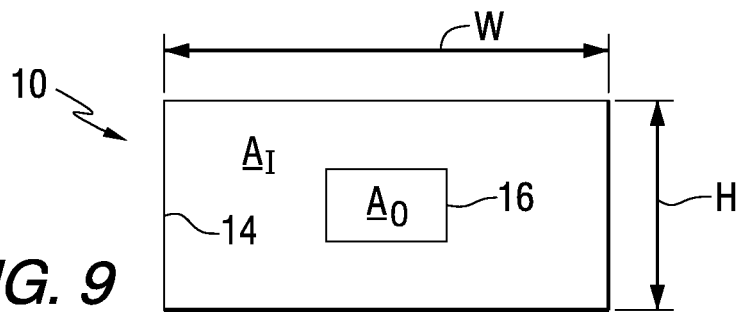
FIG. 9 is a partially schematic end view of the inlet opening of a wind funnel in accordance with an embodiment of the present invention.

In the embodiment shown in FIG. 9, the inlet opening 14 of the wind funnel 10 has a rectangular shape, and the outlet opening 16 also has a rectangular shape. The inlet opening 14 has a cross-sectional area $A_I$ corresponding to the product of W·H. The outlet opening 16 has a smaller cross-sectional area $A_O$ which, in the embodiment shown, represents the product of the height and width of the outlet opening multiplied together. As described above, the ratio of $A_I:A_O$ may typically range from 3:1 to 80,000:1, for example, from 5:1 to 10,000:1, or from 10:1 to 5,000:1, or from 20:1 to 1,000:1.

Figure 10:
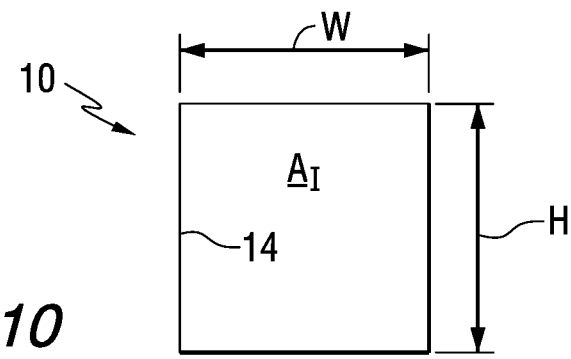
FIG. 10 is a partially schematic end view of the inlet opening of a wind funnel in accordance with another embodiment of the present invention.

In the embodiment shown in FIG. 10, the inlet opening 14 of the wind funnel 10 has a generally square cross-sectional shape with a cross-sectional area $A_I$ corresponding to the product of W·H. Although not shown in FIG. 10, the wind funnel 10 also has an outlet opening 16 of any desired cross-sectional shape, such as square, rectangular, round or the like.

Figure 11:
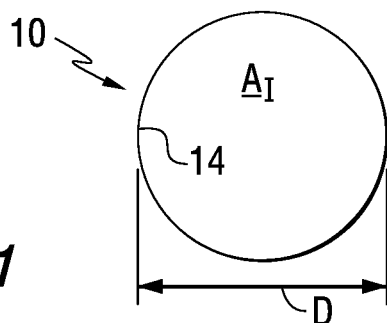
FIG. 11 is a partially schematic end view of the inlet opening of a wind funnel in accordance with a further embodiment of the present invention.

In the embodiment shown in FIG. 11, the inlet opening 14 of the wind funnel 10 is generally circular with a diameter D. The cross-sectional area $A_I$ is also labeled in FIG. 11.

Figure 12:
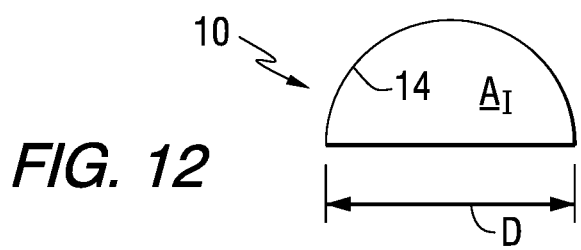
FIG. 12 is a partially schematic end view of the inlet opening of a wind funnel in accordance with another embodiment of the present invention.

In the embodiment shown in FIG. 12, the inlet opening 14 of the wind funnel 10 is generally hemispherical and has a diameter D. The cross-sectional area $A_I$ of the inlet opening is also labeled in FIG. 12.

Figure 13:
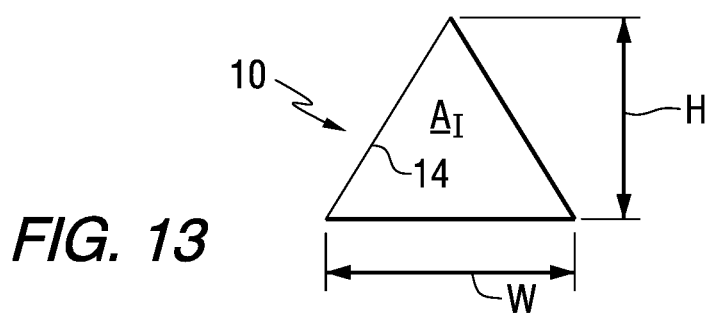
FIG. 13 is a partially schematic end view of the inlet opening of a wind funnel in accordance with a further embodiment of the present invention.

In the embodiment shown in FIG. 13, the inlet opening 14 of the wind funnel 10 has a generally triangular shape with a height H and width W. The cross-sectional area $A_I$ is also labeled in FIG. 13.

Although various wind funnel cross-sectional shapes are illustrated in FIGS. 9-13, it is to be understood that any other suitable cross-sectional shape of the inlet opening 14 and/or outlet opening 16 may be used in accordance with the present invention, e.g., trapezoidal, ovular, elliptical, etc.

FIGS. 14-17 are top views schematically illustrating various wind funnel configurations in accordance with embodiments of the present invention.

Figure 14:
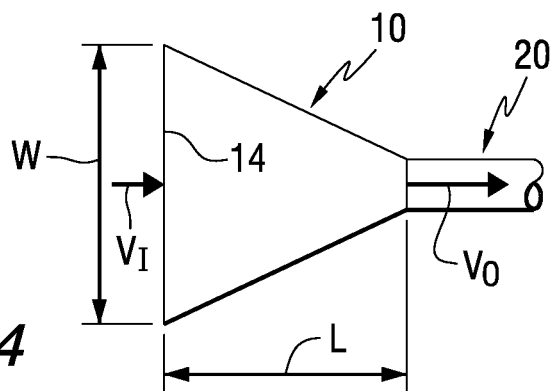
FIG. 14 is a partially schematic top view of a wind funnel in accordance with an embodiment of the present invention.

In the embodiment shown in FIG. 14, the body of the wind funnel 10 includes generally flat angled sides similar to the embodiments shown in FIGS. 3 and 5.

Figure 15:
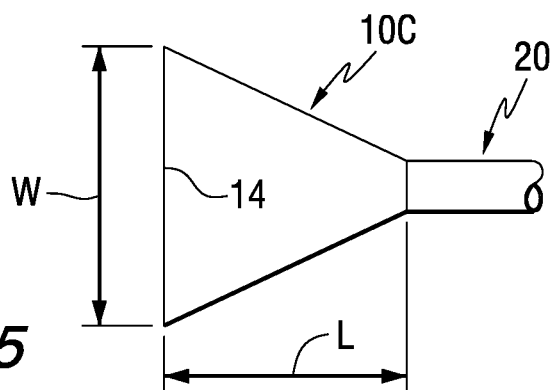
FIG. 15 is a partially schematic top view of a wind funnel in accordance with another embodiment of the present invention.

In the embodiment shown in FIG. 15, the wind funnel 10C comprises a convexly curved inner surface.

Figure 16:
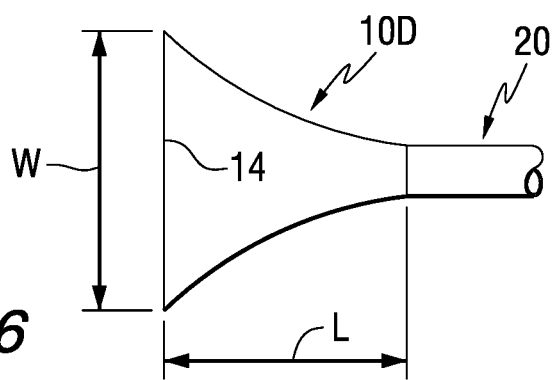
FIG. 16 is a partially schematic top view of a wind funnel in accordance with a further embodiment of the present invention.

In the embodiment shown in FIG. 16, the wind funnel 10D comprises a concavely curved inner surface.

Figure 17:
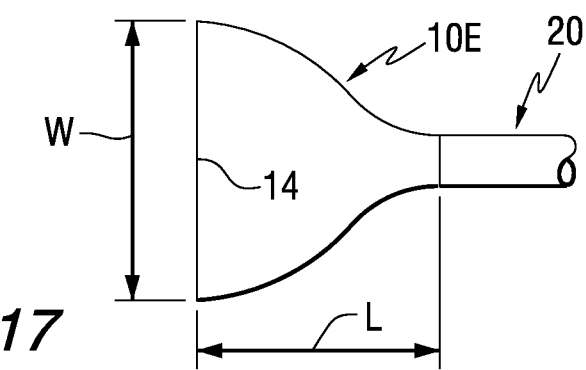
FIG. 17 is a partially schematic top view of a wind funnel in accordance with another embodiment of the present invention.

In the embodiment shown in FIG. 17, the wind funnel 10E comprises a complex curved inner surface including a concave portion near the inlet opening 14 and a convex portion near the exit opening.

In the embodiments shown in FIGS. 14-17, the various wind funnels have a width W and a length L, which may correspond to the widths W and lengths L described above.

In accordance with embodiments of the present invention, the particular configuration of the wind funnel 10 may be selected based upon various parameters or factors such as prevailing wind speeds, land topography, land availability, elevation, ambient temperature, turbine output power and the like. For example, computer modeling may be performed in order to optimize the shape and size of the wind funnel 10.

Figure 18:
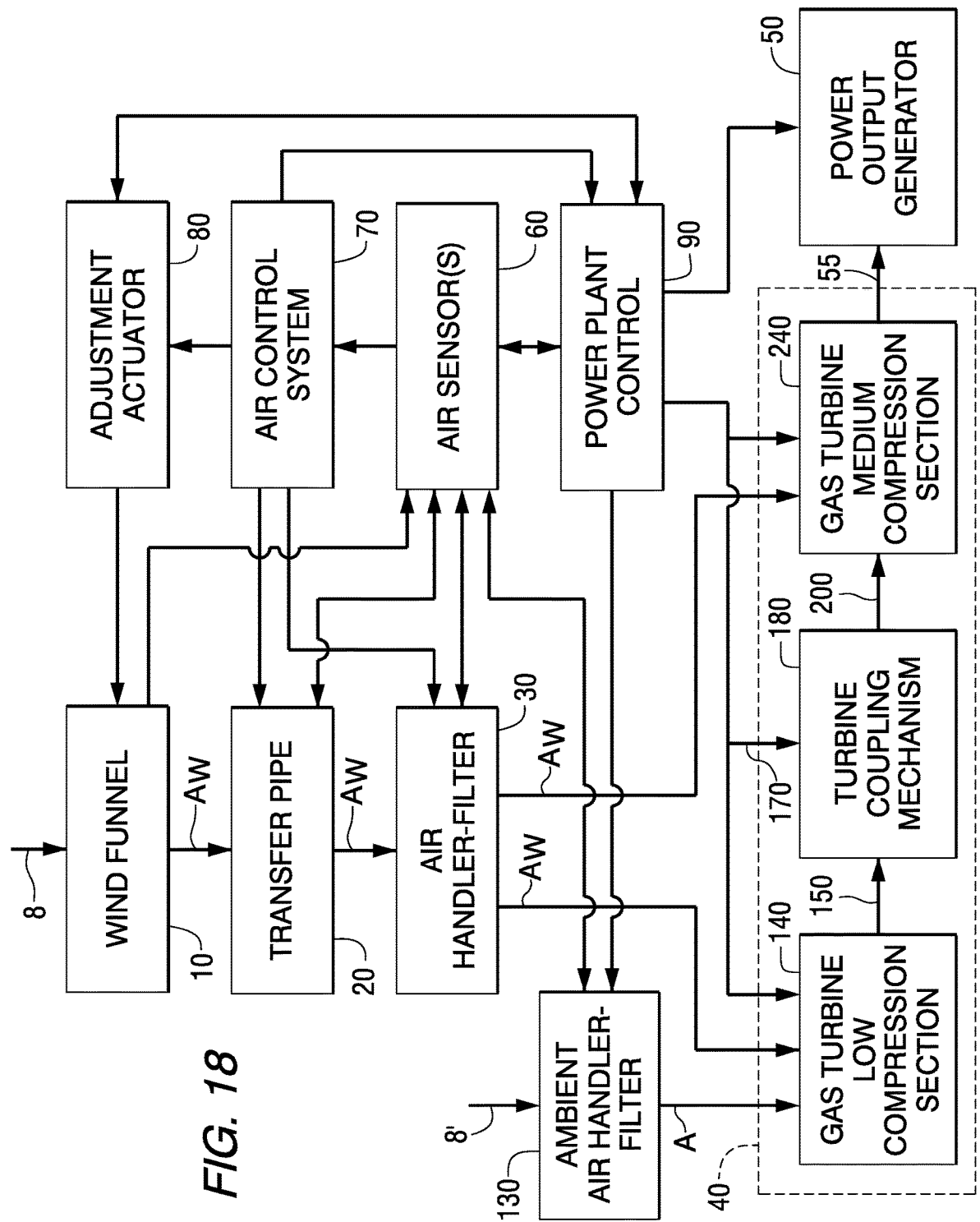
FIG. 18 is a schematic flow diagram illustrating the introduction of pressurized air from a wind funnel into a low compression section or into a medium compression section of a gas turbine in accordance with an embodiment of the present invention.

FIG. 18 schematically illustrates a wind-assisted gas turbine system similar to that shown in the embodiment of FIG. 4, with the addition of engageable and disengageable gas turbine compression sections in accordance with an embodiment of the present invention. The wind funnel 10 as described above communicates with the transfer pipe 20, which communicates with the air handler and filter 30 which, in turn, delivers compressed air $A_w$ from the wind funnel 10 to the gas turbine 40. Although not shown in FIG. 18, hydrocarbon fuel F is fed to the gas turbine 40 as shown in the embodiments of FIGS. 1 and 4. The gas turbine 40 is connected to the power output generator 50 by a driven shaft 55. For purposes of simplification and clarity, the combustion section 42 and expansion section 43 of the gas turbine 40 are not shown in FIG. 18. In accordance with this embodiment, the gas turbine 40 includes a first low compression section 140 with an output shaft 150, and a second medium compression section 240 with an input shaft 200. A turbine coupling mechanism 180 is provided between the output shaft 150 and the input shaft 200, which allows the first and second compression sections 140 and 240 of the gas turbine 40 to be selectively engaged and disengaged from each other.

As further shown in FIG. 18, the first low compression section 140 of the gas turbine 40 may be fed by ambient air 8' that enters the front end of the compression section 140, while compressed air fed from the wind funnel 10 can selectively enter the gas turbine 40 at the same location or downstream from the point that the ambient air 8' enters the first compression section 140. The air feed system illustrated in FIG. 18 includes separate compressed air and ambient air feed sources. In this embodiment, the compressed air from the wind funnel 10 can be directed against specific desired rows of blades in either the low compression section 140 or the medium compression section 240 of the gas turbine for maximum impact. Although not shown in FIG. 18, compressed air from the wind funnel 10 may also be introduced into a high compression section of the gas turbine 40 if desired. Compressed air can be directed with jets, nozzles, embedded pipes and the like. The compressed air may be directed at an angle such that it hits the angled blade faces at 90 degrees or close to 90 degrees. Supplementary fresh air 8' from fresh air handler and filter 30 may still be passed through the front low pressure section 140 if directed by the air control system which may respond to commands from the power plant controller 90. If more power is desired, compressed air may be directed to the front end low pressure compression section 140 of the gas turbine 40, e.g., through pipes and/or nozzles directly hitting blades at an angle in the front low pressure section 140.

There may be high wind speeds when it is desirable to channel all compressed air from the wind funnel 10 into the medium compression section 240 of the gas turbine 40. In this case, the turbine coupling mechanism 180 may disengage the output shaft 150 of the low compression section 140 from the spinning input shaft 200 of the medium compression section 240 in order to improve efficiency. In certain embodiments, the power output generator 50 may be a two-stage generator with a coupling therebetween to selectively engage and disengage the generator sections, as more fully described below.

Figure 19:
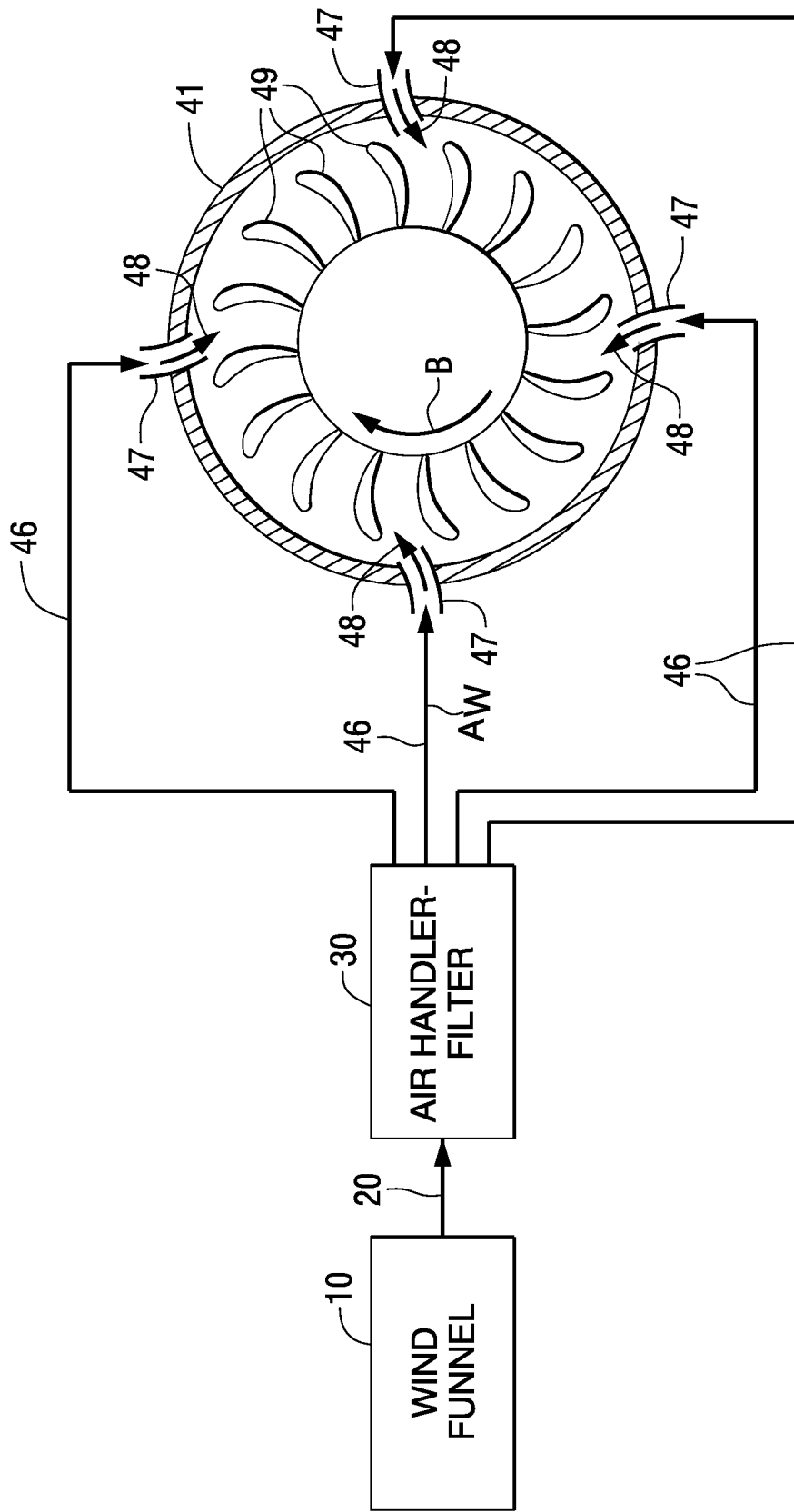
FIG. 19 is a schematic flow diagram including a partially schematic cross-sectional view of a compressor section of a gas turbine, illustrating introduction of pressurized air from a wind funnel into the compressor section.
Figure 20:
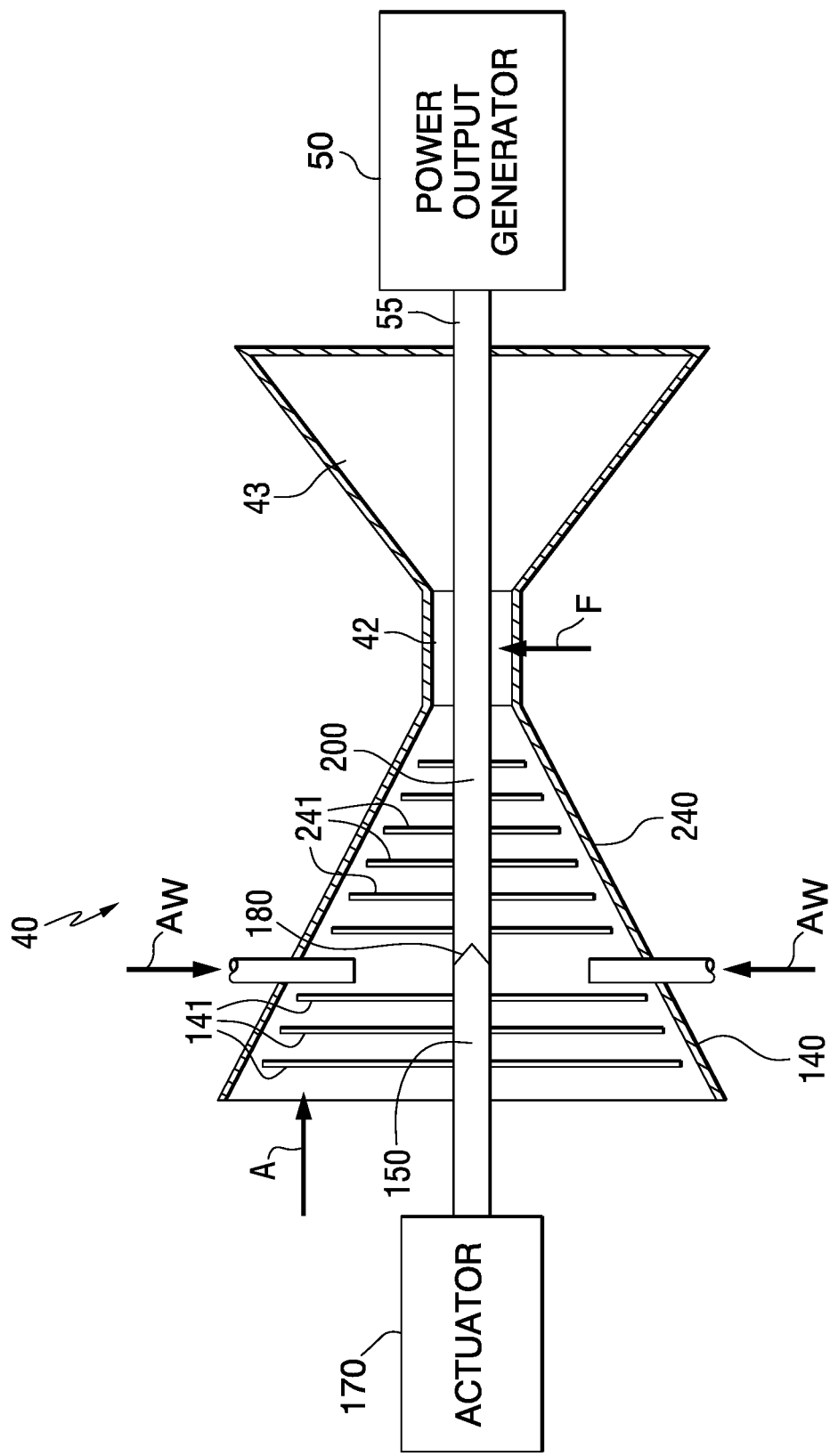
FIG. 20 is a partially schematic side sectional view of a wind-assisted gas turbine including a coupling mechanism to selectively engage and disengage compression sections of the gas turbine in accordance with an embodiment of the present invention.

FIGS. 19 and 20 schematically illustrate a wind funnel 10 and compressed air feed system 30 in which compressed air is fed to a set of turbine blades in a selected compression section of a gas turbine in accordance with an embodiment of the present invention. As shown in FIGS. 19 and 20, compressed air $A_w$ from the wind funnel 10, transfer pipe 20 and air handler-filter 30 is separated into multiple flow paths 46 for introduction into the compression section 41 of the gas turbine 40 at selected circumferential locations. A series of nozzles 47 introduce compressed air flow 48 into the interior of the compression section 41 toward the turbine blades 49, which rotate in the direction of arrow B. The compressed air may flow in equal amounts to each nozzle 47, or may be controlled to flow in non-equal amounts, e.g., more compressed air may be fed to the upper nozzle 47 in FIG. 20. As shown in FIG. 19, the compressed air flow 48 generated from the wind funnel 10 may be directed into the compression section 41 through the nozzles 47 in an angled direction having a component normal to air impact surfaces of the turbine blades 49, e.g., in an air feed direction having a component in the circumferential rotation direction of the turbine blades 49.

As shown in FIG. 20, the gas turbine 40 includes a combustion section 42 downstream from the first and second compression sections 140 and 240, and an expansion section 43 downstream from the combustion section 42. Ambient air A can enter the front end of the first compression section 140, while compressed air $A_w$ fed from the wind funnel 10 can enter the gas turbine 40 downstream from the first compression section 140, and upstream from the second compression section 240. The hydrocarbon fuel F such as natural gas or the like is fed into the combustion section 42 of the gas turbine 40 by conventional fuel injection means known to those skilled in the art, where oxygen contained in the compressed air $A_w$ from the wind funnel 10 is used to combust the fuel F.

As further shown in FIG. 20, the coupling mechanism 180 may be used to selectively engage and disengage the first compression section 140 of the gas turbine 40 from its second compression section 240. The first compression section 140 includes a first rotatable shaft 150 having a series of turbine blades or vanes 141 mounted thereon. The second compression section 240 includes a second rotatable shaft 200 having a series of turbine blades or vanes 241 mounted thereon.

An actuator 170 may be provided adjacent to the first compression section 140 and may engage the first rotatable shaft 150 of the first compression section 140. The actuator 170 may include a roller bearing assembly (not shown) in which an end of the first rotatable shaft 150 is rotatably mounted, but constrained in its axial movement in relation to the roller bearing assembly of the actuator. Lateral movement of the actuator 170 side-to-side may cause the first rotatable shaft 150 of the first compression section 140 to move along its longitudinal axis toward and away from the second rotatable shaft 200 of the second compression section 240. In this manner, the coupling mechanism 180 engages and disengages the first and second compression section shafts 150 and 200 upon lateral movement of the actuator 170.

The system illustrated in FIG. 20 may operate as follows during periods of high wind. The male and female components of the coupling mechanism 180 may be disconnected between the first and second compressor sections 140 and 240, and compressed air from the wind funnel 40 may only be introduced into the second compressor section 240 to thereby lower the cost of the power supply and increase efficiency. Such disconnection of the compressor sections may decrease costs and provide additional savings.

Figure 21:
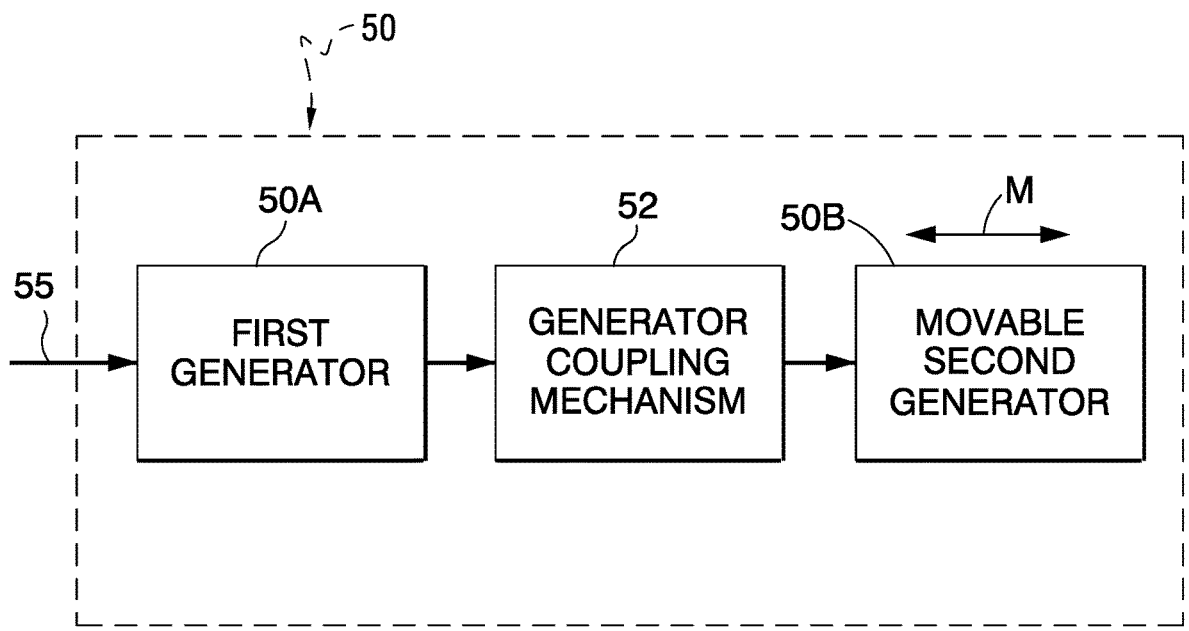
FIG. 21 is a schematic flow diagram illustrating features of a generator system with two engageable and disengageable sections for use with a wind-assisted gas turbine in accordance with an embodiment of the present invention.
Figure 22:
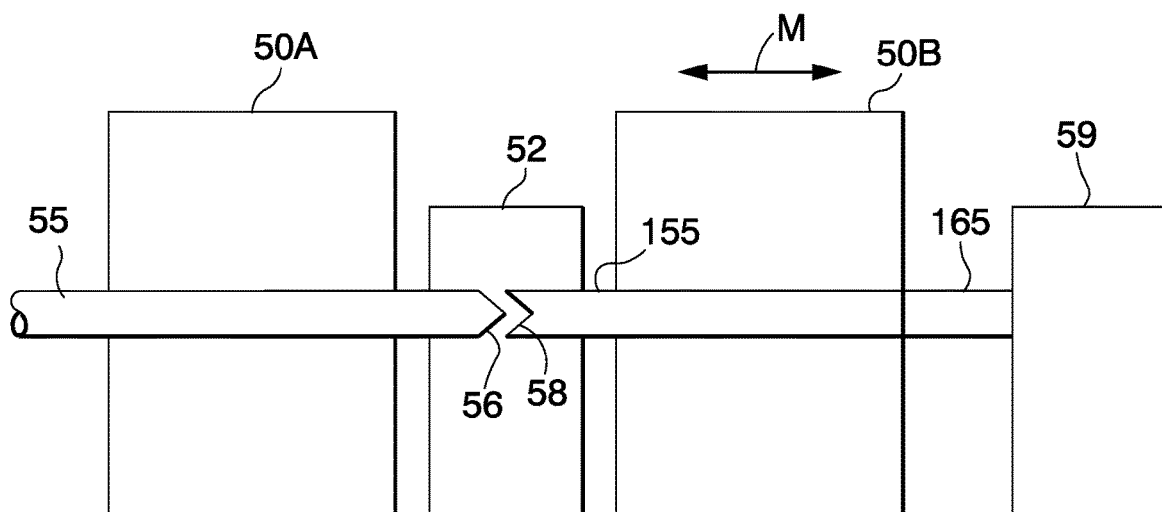
FIG. 22 is a partially schematic side view of a generator system with two engageable and disengageable sections for use with a wind-assisted gas turbine in accordance with an embodiment of the present invention.

FIGS. 21 and 22 illustrate an embodiment of the present invention in which the wind-assisted gas turbine 40 drives a power output generator 50 having a first generator 50A and a second generator 50B engageable and disengageable from each other by a generator coupling mechanism 52. As shown in FIG. 22, the driven shaft 55 extending through the first generator 50A is disengageably coupled to a second driven shaft 155 extending into or through the second generator 50B by means of the generator coupling mechanism 52. In the embodiment shown, the generator coupling mechanism 52 includes a male coupling 56 at the end of the first driven shaft 55 that is receivable within a female coupling 58 and the end of the second driven shaft 155.

As further shown in FIGS. 21 and 22, the second generator 50B is moveable in relation to the first generator 50A as schematically shown by the arrow M. By moving the second generator 50B in the direction of the movement arrow M, the movable second generator 50B may be moved from a disengaged position as shown in FIG. 22, in which the male 56 and female 58 couplings are disengaged from each other, to an engaged position in which the male coupling 56 is received within the female coupling 58 to thereby allow torque transmission from the driven shaft 55 extending through the first generator 50A to the driven shaft 155 extending into the movable second generator 50B. Any suitable means (not shown) may be used to move the generator second section 50B, such as rollers, wheels, tracks, conveyor belts and the like that may be installed below the movable second generator 50B. Once the second generator 50B is moved into either the engaged or disengaged position, it can be secured in place by any suitable means such as a latch mechanism (not shown).

As shown in FIG. 22, a generator actuator 59 may be used to push or pull the second generator 50B into the engaged or disengaged position using a piston rod 165 or the like that extends from the generator actuator. The rotatable driven shaft 155 does not extend externally rightwardly from the second generator 50B in the embodiment shown in FIG. 22. Alternatively, the driven shaft 155 may extend through and rightwardly from the second generator 50B, and the generator actuator 59 may include a roller bearing assembly (not shown) for supporting and aligning the driven shaft 155 during operation. Excess energy may thus be captured into electrical power by use of disconnectable generator sections, e.g., by robotically pushing the shaft 155 of the second generator 50B into engagement with the shaft 55 of the first generator 50A in front of it with the generator stationary, or pushing the whole second generator forward to connect and produce energy or to pull it back when wind energy drops.

A sensor and control system (not shown) may be used to ensure that the first 55 and second 155 rotatable shafts of the corresponding first and second generators 50A and 50B are aligned in the desired rotational orientation with respect to each other. This ensures that the first and second generators 50A and 50B are in phase with each other when engaged, i.e., the sinusoidal alternating current wave forms from each of the first and second generators match each other.

Information on air velocity, temperature, density and humidity detected by sensors at various points from the wind to the output may be collected to determine the minimum quantity of natural gas or the hydrocarbon fuel F needed to be injected into burner section 42 of the gas turbine 40. That same information may be used to determine if there is more or less energy to route using an air handler to a smaller natural gas turbine or a larger natural gas turbine. If too much energy and power is wanted then the actuator for the generator may advance the second generator section to connect to the first generator section, depending on more or less demand for power from the grid control center.

The following example is intended to illustrate various aspects of the present invention and is not intended to limit the scope of the invention.

Example

A wind funnel and gas turbine system may be provided and operated using the following configuration. A wind funnel is provided in the shape of a cylindrical half cone sliced in half laid flat on the ground and rotatable around a vertical axis. The wind funnel has a width of 220 meters corresponding to the diameter of the half cone at its inlet opening, and a length of 220 meters measured from the inlet opening to the outlet opening. The base is an isosceles triangle for symmetry. The wind funnel and gas turbine are located on substantially flat ground with no surrounding obstructions to wind flow. The height above sea level is 500 feet. The ambient temperature is 80° F., with variable humidity. A prevailing wind speed of 25 mph may occur during operation. The gas turbine has a power capacity of 28.6 MW. The compressed air pipe is not run underground or cooled. With this wind funnel configuration and these operating parameters, an impact in power of between 7 to 14 MW-20 MW (high wind velocity) or more in costs fuel savings may be achieved. Such 7 to 14 MW savings may only be available when the wind is available, which is mostly in daytime.

An E 126 Enercom wind blade turbine with input space of 12,665 meters produces currently 7 MW. A gas turbine that produces 28.6 MW has a simple cycle (no combined cycle and no heat recovery) efficiency of 37%. Meaning 77.402 MW of energy is inputted into the natural gas turbine system to produce 28.6 MW of electrical energy, and 10 MW of heat. So 77.4 MW inputted energy minus 28.6 MW output electrical minus 10 MW heat=38.8 MW is spent as kinetic energy fuel costs on pulling air into the compressor section of the turbine and expelling it. So 7 MW of savings is applied to that 77.4 MW total=gross 9% savings. Or the 7 MW reduction is applied to reduction in 38.8 kinetic energy to pull air in and expel it at 18% savings in losses. If 14 MW kinetic energy is inputted through the wind funnel and it is all applied, then the savings may double: 14/77.4 gives 18% of gross costs or 14 MW/38.8=36% reduction in kinetic energy costs of pulling in air and expelling air.

The present invention provides several benefits. The present invention takes advantage of maximum wind speeds under most operating conditions except when the grid does not need power. It is noted that most grids flow one way and thus have been designed inflexibly. Utilities are often forced to absorb night time costs when demand may be reduced by up to 40 percent or more. With the present invention, there are minimal parts associated with the wind funnel, providing lower total cost of ownership.

Whereas particular embodiments of this invention have been described above for purposes of illustration, it will be evident to those skilled in the art that numerous variations of the details of the present invention may be made without departing from the invention as defined in the appended claims.

What is claimed is:

1. A wind funnel and gas combustion turbine system comprising:
   a wind funnel comprising an inlet opening having a cross-sectional area and an outlet opening having a cross-sectional area less than the cross-sectional area of the inlet opening, wherein the wind funnel is inwardly tapered between the inlet opening and the outlet opening; and
   a stationary gas combustion turbine in flow communication with the wind funnel, wherein the wind funnel is structured and arranged to receive air from a wind source through the inlet opening and to discharge compressed air from the outlet opening for delivery to a gas compression section of the stationary gas combustion turbine comprising a low compression section and a medium compression section, and wherein the compressed air from the wind funnel is introduced into the gas compression section of the stationary gas combustion turbine downstream from a first row of rotatable blades attached to a rotatable turbine shaft in the gas compression section, and the compressed air from the wind funnel is selectively introduced alternatively into the low compression section and into the medium compression section.

2. The wind funnel and gas combustion turbine system of claim 1, wherein the compressed air from the wind funnel is selectively introduced into the gas compression section at multiple locations downstream from the first row of rotatable blades.

3. The wind funnel and gas combustion turbine system of claim 1, wherein the gas compression section of the stationary gas combustion turbine comprises the low compression section including an output shaft, the medium compression section including an input shaft, and a turbine coupling mechanism structured and arranged to selectively engage and disengage the output and input shafts to thereby engage and disengage the low and medium compression sections from each other.

4. The wind funnel and gas combustion turbine system of claim 1, wherein the stationary gas combustion turbine comprises a combustion section comprising a fuel inlet into which a hydrocarbon fuel is fed, and oxygen from the compressed air from the wind funnel is combined with the hydrocarbon fuel in the combustion section for combustion of the hydrocarbon fuel.

5. The wind funnel and gas combustion turbine system of claim 4, wherein the hydrocarbon fuel comprises natural gas.

6. The wind funnel and gas combustion turbine system of claim 1, wherein the wind funnel is rotatable around a vertical axis to adjust for different prevailing wind directions.

7. The wind funnel and gas combustion turbine system of claim 6, further comprising a support member adjacent the inlet opening of the wind funnel structured and arranged to support the wind funnel when it is rotated around the vertical axis, wherein the support member comprises at least one wheel engageable with an arcuate track supported by ground below the wind funnel.

8. The wind funnel and gas combustion turbine system of claim 1, wherein the inlet opening of the wind funnel has a cross-sectional area, the outlet opening of the wind funnel has a cross-sectional area, and a cross-sectional area ratio of the cross-sectional area of the inlet opening to the cross-sectional area of the outlet opening is from 5:1 to 10,000:1, and wherein the wind funnel has an internal volume $F_V$ of 1,000 to 15,000,000 m$^3$.

9. The wind funnel and gas combustion turbine system of claim 1, further comprising a transfer pipe extending from the outlet opening of the wind funnel in flow communication between the wind funnel and the gas compression section of the stationary gas combustion turbine.

10. The wind funnel and gas combustion turbine system of claim 1, further comprising a compressed air handler-filter in flow communication between the wind funnel and the gas compression section of the stationary gas combustion turbine.

11. The wind funnel and gas combustion turbine system of claim 1, further comprising an ambient air inlet in flow communication with the gas compression section of the stationary gas combustion turbine.

12. The wind funnel and gas combustion turbine system of claim 11, wherein the ambient air inlet is structured and arranged to introduce ambient air into the gas compression section of the stationary gas combustion turbine upstream from a location of introduction of the compressed air from the wind funnel into the gas compression section.

13. The wind funnel and gas combustion turbine system of claim 11, further comprising an ambient air handler-filter in flow communication between a source of ambient air separate from the air received from the wind source through the inlet opening of the wind funnel and the gas compression section of the stationary gas combustion turbine.

14. A wind funnel and gas combustion turbine system comprising:
   a wind funnel comprising an inlet opening having a cross-sectional area and an outlet opening having a cross-sectional area less than the cross-sectional area of the inlet opening, wherein the wind funnel is inwardly tapered between the inlet opening and the outlet opening; and
   a stationary gas combustion turbine in flow communication with the wind funnel, wherein the wind funnel is structured and arranged to receive air from a wind source through the inlet opening and to discharge compressed air from the outlet opening for delivery to a compression section of the stationary gas combustion turbine, and wherein the compression section comprises a low compression section and a medium compression section, and the compressed air from the wind funnel is selectively introduced alternatively into the low compression section and into the medium compression section.

15. A wind funnel and gas combustion turbine system comprising:
   a wind funnel comprising an inlet opening having a cross-sectional area and an outlet opening having a cross-sectional area less than the cross-sectional area of the inlet opening, wherein the wind funnel is inwardly tapered between the inlet opening and the outlet opening; and
   a stationary gas combustion turbine in flow communication with the wind funnel, wherein the wind funnel is structured and arranged to receive air from a wind source through the inlet opening and to discharge compressed air from the outlet opening for delivery to a gas compression section of the stationary gas combustion turbine, wherein the gas compression section comprises a low compression section including an output shaft, a medium compression section including an input shaft, and a turbine coupling mechanism structured and arranged to selectively engage and disengage the output and input shafts to thereby engage and disengage the low and medium compression sections from each other, and wherein the compressed air from the wind funnel is selectively introduced alternatively into the low compression section and into the medium compression section.

16. The wind funnel and gas combustion turbine system of claim 15, wherein the low and medium compression sections are engaged with each other by the turbine coupling mechanism when the compressed air from the outlet opening of the wind funnel is delivered to the low compression section, and the low and medium compression sections are disengaged from each other by the turbine coupling mechanism when the compressed air from the outlet opening of the wind funnel is only delivered to the medium compression section.

17. The wind funnel and gas combustion turbine system of claim 15, further comprising an actuator connected to the input shaft structured and arranged to move the input shaft toward the output shaft to thereby drivingly engage the input and output shafts through the turbine coupling mechanism, and to move the input shaft away from the output shaft to thereby drivingly disengage the input and output shafts.

18. The wind funnel and gas combustion turbine system of claim 17, wherein the actuator drivingly disengages the input and output shafts when the compressed air from the outlet opening of the wind funnel is only delivered to the medium compression section.

19. The wind funnel and gas combustion turbine system of claim 15, comprising a plurality of the air inlets located at different positions around a circumference of the compression section of the stationary gas combustion turbine.

20. The wind funnel and gas combustion turbine system of claim 15, comprising a plurality of the air inlets located at different axial positions along an axis of rotation of the rotatable turbine shaft in the gas compression section.

21. The wind funnel and gas combustion turbine system of claim 20, wherein at least one of the plurality of air inlets is located in the low compression section, and at least another one of the plurality of air inlets is located in the medium compression section.

22. The wind funnel and gas combustion turbine system of claim 15, further comprising at least one air sensor structured and arranged to detect an air parameter at the inlet opening of the wind funnel, at the outlet opening of the wind funnel, or at an inlet of the gas compression section of the stationary gas combustion turbine, wherein the air parameter comprises air flow, air pressure, air temperature or air humidity.

23. A method of operating a wind funnel and gas combustion turbine system comprising:
    feeding compressed air from a wind funnel to a gas compression section of a stationary gas combustion turbine comprising a low compression section and a medium compression section; and
    combusting fuel in the stationary gas combustion turbine in the presence of oxygen supplied from the compressed air, wherein the wind funnel comprises:
        an inlet opening having a cross-sectional area;
        an outlet opening having a cross-sectional area less than the cross-sectional area of the inlet opening; and
        a sidewall tapered inwardly from the inlet opening toward the outlet opening, wherein the compressed air from the wind funnel is introduced into the gas compression section of the stationary gas combustion turbine downstream from a first row of rotatable blades attached to a rotatable turbine shaft in the gas compression section, and
    the compressed air from the wind funnel is selectively introduced alternatively into the low compression section and into the medium compression section.

24. The method of claim 23, wherein the gas compression section of the stationary gas combustion turbine comprises the low compression section including an output shaft, the medium compression section including an input shaft, and a turbine coupling mechanism structured and arranged to selectively engage and disengage the output and input shafts to thereby engage and disengage the low and medium compression sections from each other.

25. The method of claim 23, further comprising adjusting an orientation of the wind funnel based upon wind direction.

\* \* \* \* \*